(12) United States Patent
Choi et al.

(10) Patent No.: US 10,264,209 B2
(45) Date of Patent: Apr. 16, 2019

(54) MOBILE TERMINAL AND CONTROLLING METHOD THEREOF

(71) Applicant: LG ELECTRONICS INC., Seoul (KR)

(72) Inventors: Younhwa Choi, Seoul (KR); Yoojin Choi, Seoul (KR); Huran Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/621,366

(22) Filed: Jun. 13, 2017

(65) Prior Publication Data

US 2018/0241961 A1    Aug. 23, 2018

(30) Foreign Application Priority Data

Feb. 17, 2017    (KR) .................... 10-2017-0021380

(51) Int. Cl.
| | |
|---|---|
| H04N 5/445 | (2011.01) |
| H04N 5/44 | (2011.01) |
| G06F 1/16 | (2006.01) |
| G06F 3/0484 | (2013.01) |
| G06K 9/00 | (2006.01) |
| G06K 9/32 | (2006.01) |
| H04N 21/2343 | (2011.01) |
| H04N 21/431 | (2011.01) |
| H04N 21/443 | (2011.01) |

(Continued)

(52) U.S. Cl.
CPC ....... *H04N 5/44591* (2013.01); *G06F 1/1626* (2013.01); *G06F 3/04842* (2013.01); *G06F 3/04845* (2013.01); *G06F 3/04883* (2013.01); *G06F 3/04886* (2013.01); *G06K 9/00711* (2013.01); *G06K 9/3233* (2013.01); *H04N 5/4403* (2013.01); *H04N 5/44504* (2013.01); *H04N 7/0122* (2013.01); *H04N 21/234336* (2013.01); *H04N 21/4316* (2013.01); *H04N 21/4438* (2013.01); *G06F 2203/04803* (2013.01)

(58) Field of Classification Search
CPC .................... H04N 5/44591; H04N 5/44504
USPC .............. 348/564, 563, 565, 569, 584, 581
See application file for complete search history.

(56) References Cited

U.S. PATENT DOCUMENTS

| | | | |
|---|---|---|---|
| 8,701,020 B1 | 4/2014 | Fulcher et al. | |
| 9,756,398 B2 * | 9/2017 | Lee | ................ H04N 21/234336 |
| 2009/0251594 A1 | 10/2009 | Hua et al. | |

(Continued)

FOREIGN PATENT DOCUMENTS

| | | |
|---|---|---|
| EP | 2866452 | 4/2015 |
| WO | 2013183619 | 12/2013 |

OTHER PUBLICATIONS

European Patent Office Application Serial No. 17177055.5, Partial Search Report dated Dec. 13, 2017, 19 pages.

(Continued)

*Primary Examiner* — Jeffrey F Harold
*Assistant Examiner* — Jean W Desir
(74) *Attorney, Agent, or Firm* — Lee, Hong, Degerman, Kang & Waimey

(57) ABSTRACT

The present invention relates to a mobile terminal and controlling method thereof, suitable for outputting a portion of a video or text information by maintaining a play ratio in response to a size change of a video play region in case of playing the video in the course of multitasking execution.

20 Claims, 18 Drawing Sheets

(51) Int. Cl.
    *G06F 3/0488* (2013.01)
    *H04N 7/01* (2006.01)

(56) References Cited

U.S. PATENT DOCUMENTS

| | | |
|---|---|---|
| 2010/0169786 A1 | 7/2010 | O'Brien et al. |
| 2014/0325428 A1* | 10/2014 | Lee ..................... G06F 3/0481 |
| | | 715/781 |
| 2016/0077720 A1 | 3/2016 | Park |
| 2017/0075517 A1* | 3/2017 | Na ..................... G06F 3/04817 |

OTHER PUBLICATIONS

European Patent Office Application Serial No. 17177055.5, Search Report dated Feb. 21, 2018, 14 pages.
European Patent Office Application Serial No. 17177055.5, Office Action dated Jan. 2, 2019, 9 pages.

* cited by examiner

MOBILE TERMINAL AND CONTROLLING METHOD THEREOF

Pursuant to 35 U.S.C. § 119(a), this application claims the benefit of earlier filing date and right of priority to Korean Application No. 10-2017-0021380, filed on Feb. 17, 2017, the contents of which are hereby incorporated by reference herein in their entirety.

BACKGROUND OF THE INVENTION

Field of the Invention

The present invention relates to a mobile terminal, and more particularly, to a mobile terminal and controlling method thereof. Although the present invention is suitable for a wide scope of applications, it is particularly suitable for outputting a portion of a video or text information by maintaining a play ratio in response to a size change of a video play region in case of playing the video in the course of multitasking execution.

Discussion of the Related Art

A mobile terminal is a device which may be configured to perform various functions. Examples of such functions include data and voice communications, capturing images and video via a camera, recording audio, playing music files and outputting music via a speaker system, and displaying images and video on a display. Some terminals include additional functionality which supports game playing, while other terminals are also configured as multimedia players. More recently, mobile terminals have been configured to receive broadcast and multicast signals which permit viewing of contents, such as videos and television programs.

Generally, terminals can be classified into mobile terminals and stationary terminals according to a presence or non-presence of mobility. And, the mobile terminals can be further classified into handheld terminals and vehicle mount terminals according to availability for hand-carry.

There are ongoing efforts to support and increase the functionality of mobile terminals. Such efforts include software and hardware improvements, as well as changes and improvements in the structural components which form the mobile terminal.

Meanwhile, the demand for multitasking capable of simultaneously using a plurality of applications on a single screen in the course of using a mobile terminal is increasing. Particularly, in case of executing multitasking, there occurs a case of using an application related to a video among a plurality of applications. In doing so, a rate of a display size, which is occupied by running screens of the rest of applications simultaneously run with a video application, over a display may be increased. In this case, if a video screen is reduced without considering a play ratio of the video application, a user may have difficulty in recognizing a corresponding video. Although the play ratio of the video application is maintained, if a bottom of the video is uniformly outputted only, it may be inconvenient for the user to use the video.

SUMMARY OF THE INVENTION

Accordingly, embodiments of the present invention are directed to a mobile terminal and controlling method thereof that substantially obviate one or more problems due to limitations and disadvantages of the related art.

One object of the present invention is to provide a mobile terminal and controlling method thereof, which enables a video to be outputted by maintaining a video play ratio even if a size of a video play region is changed on a screen split interface.

Another object of the present invention is to provide a mobile terminal and controlling method thereof, by which information or controller related to a video can be outputted in an audio outputted state if a size of a video play region on a screen split interface is decreased.

Technical tasks obtainable from the present invention are non-limited by the above-mentioned technical tasks. And, other unmentioned technical tasks can be clearly understood from the following description by those having ordinary skill in the technical field to which the present invention pertains.

Technical tasks obtainable from the present invention are non-limited by the above-mentioned technical tasks. And, other unmentioned technical tasks can be clearly understood from the following description by those having ordinary skill in the technical field to which the present invention pertains.

Additional advantages, objects, and features of the invention will be set forth in the disclosure herein as well as the accompanying drawings. Such aspects may also be appreciated by those skilled in the art based on the disclosure herein.

To achieve these objects and other advantages and in accordance with the purpose of the invention, as embodied and broadly described herein, a mobile terminal according to one embodiment of the present invention may include a display outputting a screen split interface including a first region, a second region and a split indicator located between the first region and the second region, a sensing unit, and a controller configured to sense a control input to the split indicator from the sensing unit in the course of playing a video in a first size in the first region of the screen split interface, output a target region of the video to the first region by changing the first region into a second size if a size of one side of the first region according to an end point of the control input is a first length range, and output a text information or a controller to the first region by changing the first region into a third size if the size of the one side of the first region according to the end point of the control input is a second length range.

According to another aspect of the present invention, the controller is further configured to extract the target region of the currently played video in response to the control input to the split indicator.

According to another aspect of the present invention, the target region outputted to the first region changed into the second size is a region resulting from cropping the target region by maintaining a play ratio of the video in the first size and then outputting the cropped target region.

According to another aspect of the present invention, the target region is different according to a type of the currently played video and indicates a feature of the currently played video.

According to another aspect of the present invention, if a plurality of target regions are extracted, the controller is further configured to combine and output a plurality of the target regions to the first region.

According to another aspect of the present invention, if a plurality of target regions are extracted, the controller is further configured to enlarge and output a prescribed one of a plurality of the target regions according to a preset reference.

According to another aspect of the present invention, if one side of the extracted target region is smaller than that of the second size, the controller is further configured to crop the target region and an ambient region together.

According to another aspect of the present invention, if the extracted target region is shifted in the course of playing the video, the controller is further configured to crop the target region from the video in the first size based on a location of the shifted target region.

According to another aspect of the present invention, the mobile further includes a speaker. And, if a size of the first region is changed from the first size into the second size or the third size, the controller is further configured to continue to output audio of the currently played video.

According to another aspect of the present invention, the currently played video includes a real-time broadcasted video and a stored video.

According to another aspect of the present invention, if the currently played video is a real-time broadcast program, the controller is further configured to output the first region by changing the first region into the third size during an output of an advertisement image.

According to another aspect of the present invention, the mobile terminal further includes a wireless communication unit. And, if an event is received through the wireless communication unit, the controller is further configured to control a notification of the event to be outputted in a manner that the first region is overlaid with the notification.

According to another aspect of the present invention, if a control input for a response to the notification is sensed, the controller is further configured to output the target region of the video to the rest of the first region except a region having the notification outputted thereto.

According to another aspect of the present invention, if a size of the one side of the first region is changed according to the control input, the controller is further configured to maintain a size of the other side.

According to another aspect of the present invention, the one side of the first region corresponds to a height of the first region and the other side of the first region corresponds to a width of the first region.

According to another aspect of the present invention, while the text information is outputted to the first region changed into the third size, if an event related to the video occurs, the controller is further configured to output a notification indicator.

According to another aspect of the present invention, if the size of the one side of the first region according to the end point of the control input is the first length range, the controller is further configured to change the first region into the second size and output at least one play preview to the first region.

In another aspect of the present invention, as embodied and broadly described herein, a method of controlling a mobile terminal according to another embodiment of the present invention may include playing a video in a first size in a first region of a screen split interface outputted to a display, the screen split interface including a first region, a second region and a split indicator located between the first region and the second region, sensing a control input to the split indicator, outputting a target region of the video to the first region by changing the first region into a second size if a size of one side of the first region according to an end point of the control input is a first length range, and outputting a text information or a controller to the first region by changing the first region into a third size if the size of the one side of the first region according to the end point of the control input is a second length range.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings, which are given by illustration only, and thus are not limitative of the present invention, and wherein.

DETAILED DESCRIPTION OF THE INVENTION

The description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1A:
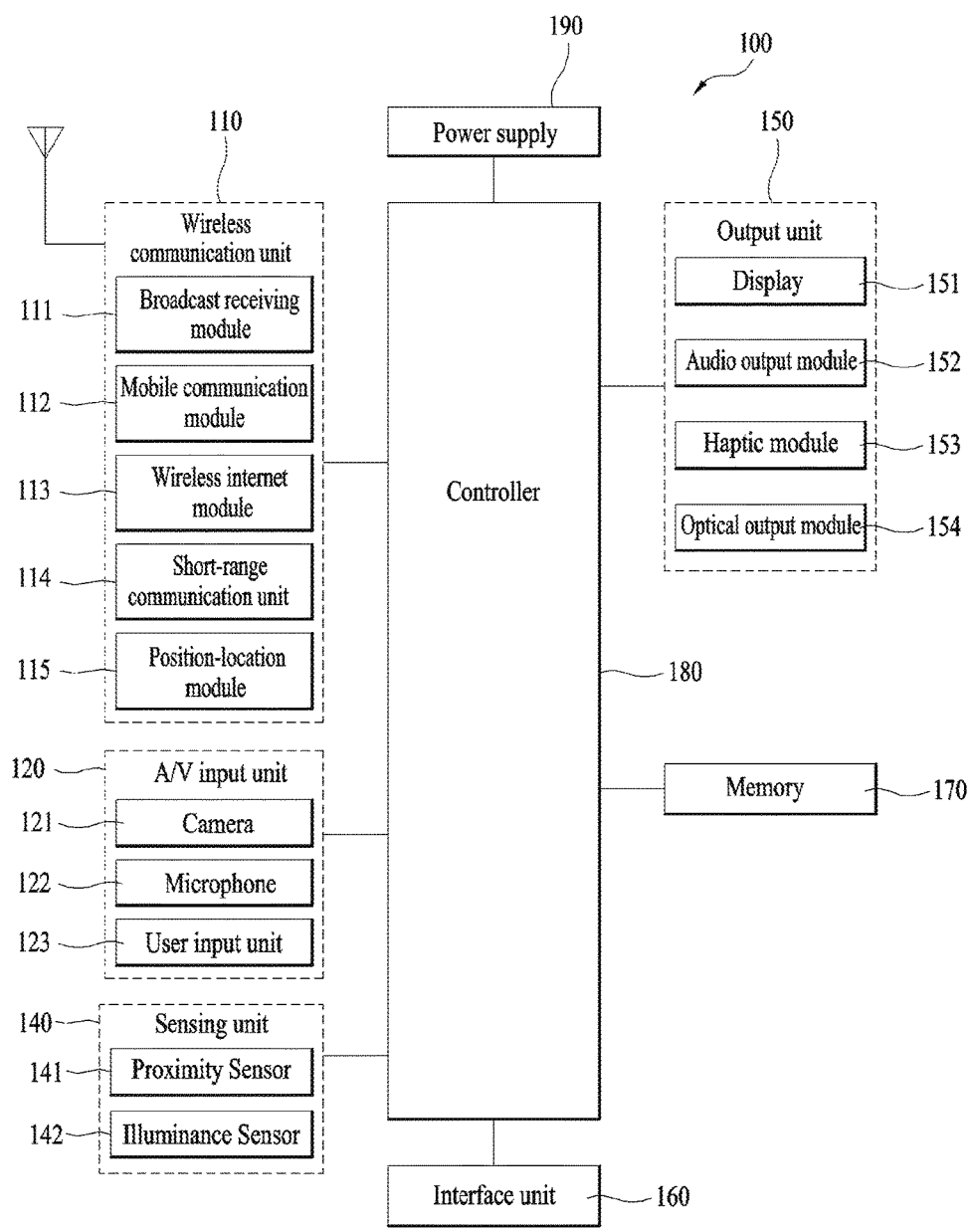
FIG. 1A is a block diagram of a mobile terminal in accordance with the present disclosure.
Figure 1B:
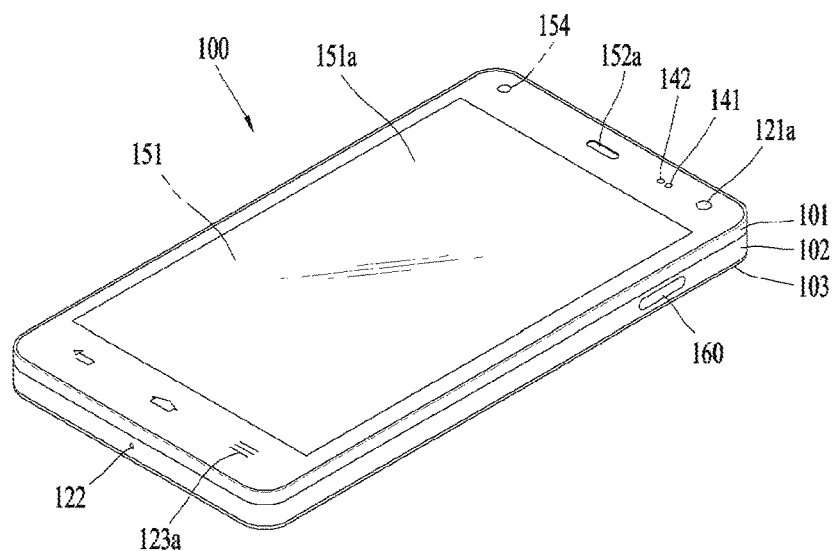
FIGS. 1B and 1C are conceptual views of one example of the mobile terminal, viewed from different directions.
Figure 1C:
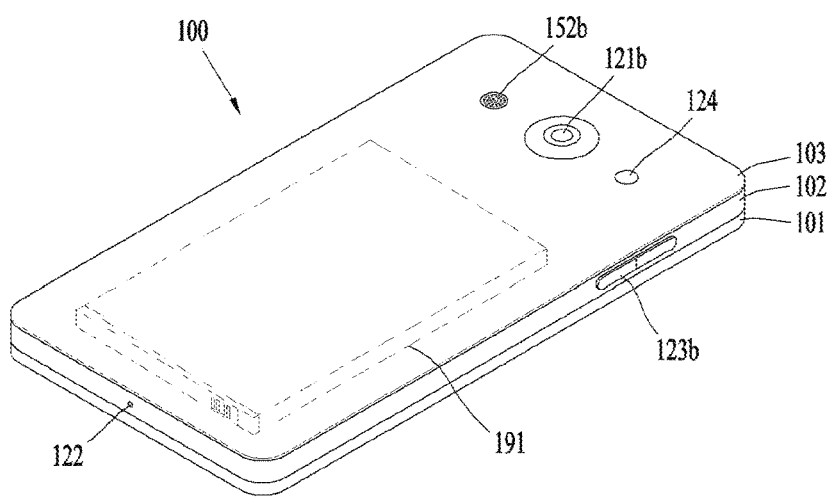

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented. Referring now to FIG. 1A, the mobile terminal 100 is shown having wireless communication unit 110 configured with several commonly implemented components.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks.

To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142. If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 processes signals, data, and informations inputted or outputted through the components mentioned in the foregoing description, or runs an application program saved in the memory 170, thereby providing or processing an information or function appropriate for to a user.

The controller 180 may provide or process information or functions appropriate for a user by processing signals, data, information and the like, which are input or output by the various components depicted in FIG. 1A, or activating application programs stored in the memory 170. As one example, the controller 180 controls some or all of the components illustrated in FIG. 1A according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

At least one portion of the respective components can cooperatively operate to implement operations, controls or controlling methods of a mobile terminal according to various embodiments of the present invention mentioned in the following description. The operations, controls or controlling methods of the mobile terminal can be implemented on the mobile terminal by running at least one application program stored in the memory 170.

Referring still to FIG. 1A, various components depicted in this figure will now be described in more detail.

Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The broadcast managing entity may be implemented using a server or system which generates and transmits a broadcast signal and/or broadcast associated information, or a server which receives a pre-generated broadcast signal and/or broadcast associated information, and sends such items to the mobile terminal. The broadcast signal may be implemented using any of a TV broadcast signal, a radio broadcast signal, a data broadcast signal, and combinations thereof, among others. The broadcast signal in some cases may further include a data broadcast signal combined with a TV or radio broadcast signal.

The broadcast signal may be encoded according to any of a variety of technical standards or broadcasting methods (for example, International Organization for Standardization (ISO), International Electrotechnical Commission (IEC), Digital Video Broadcast (DVB), Advanced Television Systems Committee (ATSC), and the like) for transmission and reception of digital broadcast signals. The broadcast receiving module 111 can receive the digital broadcast signals using a method appropriate for the transmission method utilized.

Examples of broadcast associated information may include information associated with a broadcast channel, a broadcast program, a broadcast event, a broadcast service provider, or the like. The broadcast associated information may also be provided via a mobile communication network, and in this case, received by the mobile communication module 112.

The broadcast associated information may be implemented in various formats. For instance, broadcast associated information may include an Electronic Program Guide (EPG) of Digital Multimedia Broadcasting (DMB), an Electronic Service Guide (ESG) of Digital Video Broadcast-Handheld (DVB-H), and the like. Broadcast signals and/or broadcast associated information received via the broadcast receiving module 111 may be stored in a suitable device, such as a memory 170.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like).

Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal. As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others. As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images.

A typical stereoscopic display unit may employ a stereoscopic display scheme such as a stereoscopic scheme (a glass scheme), an auto-stereoscopic scheme (glassless scheme), a projection scheme (holographic scheme), or the like.

In general, a 3D stereoscopic image may include a left image (e.g., a left eye image) and a right image (e.g., a right eye image). According to how left and right images are combined into a 3D stereoscopic image, a 3D stereoscopic imaging method can be divided into a top-down method in which left and right images are located up and down in a frame, an L-to-R (left-to-right or side by side) method in which left and right images are located left and right in a frame, a checker board method in which fragments of left and right images are located in a tile form, an interlaced method in which left and right images are alternately located by columns or rows, and a time sequential (or frame by frame) method in which left and right images are alternately displayed on a time basis.

Also, as for a 3D thumbnail image, a left image thumbnail and a right image thumbnail can be generated from a left image and a right image of an original image frame, respectively, and then combined to generate a single 3D thumbnail image. In general, the term "thumbnail" may be used to refer to a reduced image or a reduced still image. A generated left image thumbnail and right image thumbnail may be displayed with a horizontal distance difference there between by a depth corresponding to the disparity between the left image and the right image on the screen, thereby providing a stereoscopic space sense.

A left image and a right image required for implementing a 3D stereoscopic image may be displayed on the stereoscopic display unit using a stereoscopic processing unit. The stereoscopic processing unit can receive the 3D image and extract the left image and the right image, or can receive the 2D image and change it into a left image and a right image.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal.

In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

The mobile terminal 100 may be equipped with the display 151, the $1^{st}$ audio output unit 152a, the $2^{nd}$ audio output unit 152b, the proximity sensor 141, the illumination sensor 142, the optical output unit 154, the $1^{st}$ camera 121a, the $2^{nd}$ camera 121b, the $1^{st}$ manipulating unit 123a, the $2^{nd}$ manipulating unit 123b, the microphone 122, the interface unit 160, and the like.

FIGS. 1B and 1C depict certain components as arranged on the mobile terminal.

However, it is to be understood that alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 outputs information processed in the mobile terminal 100. The display unit 151 may be implemented using one or more suitable display devices.

Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented in the form of a speaker to output voice audio, alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1B illustrates the first manipulation unit 123a as a touch key, but possible alternatives include a mechanical key, a push key, a touch key, and combinations thereof.

Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

As shown in FIG. 1C, a flash 124 is shown adjacent to the second camera 121b. When an image of a subject is captured with the camera 121b, the flash 124 may illuminate the subject.

As shown in FIG. 1B, the second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body.

Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160.

Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

Further preferred embodiments will be described in more detail with reference to additional drawing figures. It is understood by those skilled in the art that the present features can be embodied in several forms without departing from the characteristics thereof.

Figure 2:
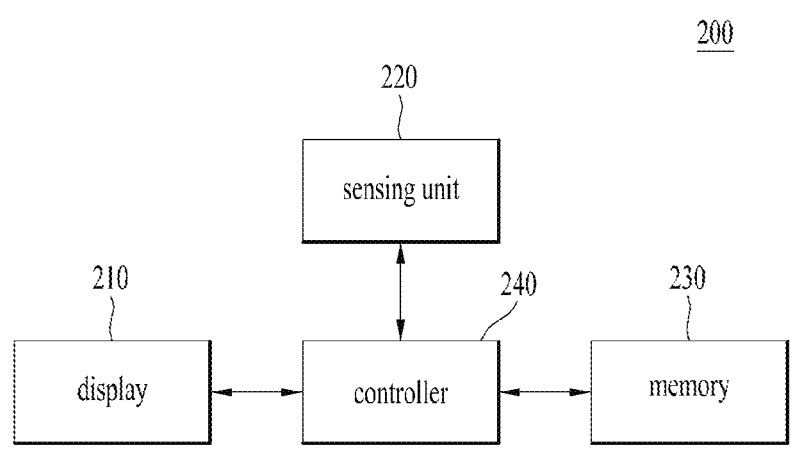
FIG. 2 is a block diagram of a mobile terminal according to one embodiment of the present invention.

FIG. 2 is a block diagram of a mobile terminal according to one embodiment of the present invention.

According to one embodiment of the present invention, a mobile terminal may include a display 210, a sensing unit 220, a memory 230 and a controller 240. Meanwhile, the mobile terminal may further include a speaker (not shown) and a wireless communication unit (not shown) [not shown in FIG. 2]. Moreover, configuration modules included in the mobile terminal is non-limited by the above modules and may further include various configuration modules.

The display 210 may display visual information. In this case, the visual information may include content, application, image, video, icon, user interface and the like. And, the display 210 may display information processed by the mobile terminal. For instance, the display 210 may basically outputs various images and text information and also display UI (user interface) and GUI (graphic user interface) according to a running screen of an application program run in the mobile terminal. Moreover, the display 210 can output visual information based on a control command of the controller 240.

According to the present invention, the display 210 may be embodied as the former display 151 shown in FIG. 1A. According to one embodiment of the present invention, the display 210 may be embodied as a touchscreen together with the sensing unit 220. According to one embodiment of the present invention, the display 210 may output a screen split interface including a first region and a second region.

The sensing unit 220 senses user's various inputs to the mobile terminal and environment of the mobile terminal and is then able to deliver a sensing result to enable the controller 240 to perform a corresponding operation. According to the present invention, the sensing unit 220 may be embodied as the former sensing unit 140 or the input unit 120 shown in FIG. 1A.

According to one embodiment of the present invention, the sensing unit 220 may include a fingerprint sensing unit and a touch sensing unit. For instance, the fingerprint sensing unit may sense user's fingerprint information and be embedded in the display 210 or the like. For instance, the touch sensing unit may sense various kinds of direct touches such as a short touch, a long touch, a drag touch and the like.

The memory 230 can store data related to operations performed in the mobile terminal. For instance, the memory 230 may include a storage medium outside the mobile terminal as well as a storage medium provided to the mobile terminal. According to one embodiment of the present invention, the memory 230 can be embodied as the former memory 170 shown in FIG. 1A. According to one embodiment of the present invention, the memory 230 can store a video played in the screen split interface.

According to one embodiment of the present invention, audio information of a currently outputted video may be outputted through the speaker (not shown). According to one embodiment of the present invention, a currently broadcasted program may be received and an event such as a text message may be received, through the wireless communication unit (not shown).

The controller 240 may process data, control the respective units of the mobile terminal, and control data transmissions/receptions between the units. According to the present invention, the controller 240 can be embodied as the former controller 180 shown in FIG. 1A. According to one embodiment of the present invention, the controller 240 can control a size of the first region in response to a control input to the screen split interface.

According to one embodiment of the present invention, operations performed by the mobile terminal can be controlled by the controller 240. Yet, for clarity of the following description, such operations shall be described as performed by the mobile terminal in general. Through the embodiments shown in FIGS. 3 to 17, a method of outputting a partial region of a video in response to a change of a size of a video played region on a screen split interface of a mobile terminal shall be described in detail as follows.

Figure 3:
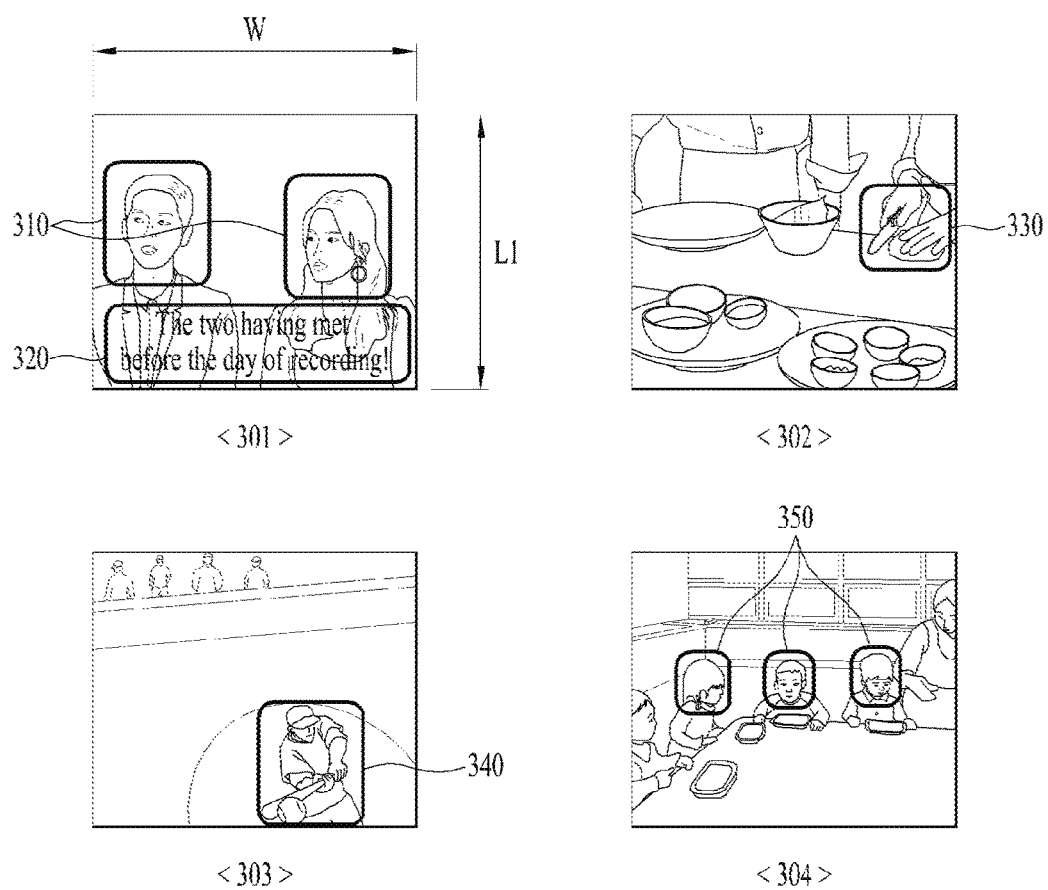
FIG. 3 is a diagram showing one example of executing image recognition in a mobile terminal according to one embodiment of the present invention.

FIG. 3 is a diagram showing one example of executing image recognition in a mobile terminal according to one embodiment of the present invention.

While a screen split interface of a mobile terminal is outputted, a video can be controlled to be played at a preset screen ratio. For instance, referring to FIG. 3, the mobile terminal may control a video to be played at a W:L1 ratio of one side of a video play region to the other side. Herein, the one side of the video play region may correspond to a width and the other side may correspond to a height.

Meanwhile, if sensing a control input for side adjustment of a video outputted region, the mobile terminal may extract a target region in the first place. The target region may correspond to a significant region of a video in order to enable the video to continue to be outputted despite a region size of a currently outputted video is changed. Namely, the target region may correspond to a feature part of the video. The target region may vary depending on a type of the currently played video. If the size adjustment of the video outputted region is not required, the extraction of the target region may be unnecessary. Yet, if the size adjustment is required, the extraction of the target region is necessary. In order to extract a featured target region from the video, various kinds of video (or image) recognition technologies may be necessary.

For instance, image recognition of recognizing, identifying and tracking can be performed through data definition, detection and modelling using type, shape, action analysis, movement and color information of an object contained in a video by image analysis (Intelligent video monitoring system by KIM Tae Kyung & PAIK Nam June, 2012). Moreover, for instance, a background region is separated from an image, an object is identified, detecting an event based on a preset rule, and image recognition can be performed. Besides, various image recognition technologies may include various image recognition algorithms known to those skilled in the art through general knowledge.

If recognizing at least one object in a video by the image recognition technology, a mobile terminal may set a target region. For example, a mobile terminal may set a face region as a target region through face recognition from a video. For instance, the face recognition may include a face region extracting process for identifying where a face is located in a full image and a face recognizing process for determining who the extracted face region is. Besides, face recognition may be performed within a video through various schemes.

For another example, a mobile terminal may extract a target region through text recognition from a video. For further example, a mobile terminal may extract a target region from a video through object action recognition. For instance, a mobile terminal may recognize and extract person's gesture or action from a video. For instance, a moveless background and a movement-sensed region are separated from each other in a video, and the movement sensed region may be set as a target region. For instance, a mobile terminal may extract a comprehensive act by recognizing simple action informations from an image and then combining the action informations. Besides, it is apparent that a featured target can be extracted from a video through various technologies.

According to the present invention, if a plurality of regions, each of which becomes a center, are extracted from a video, a mobile terminal may set all of the regions as a target region or set a prescribed one of the regions as a target region by giving prioritizing the prescribed region. According to the present invention, if an extracted target region is shifted within a video in the course of playback, a mobile terminal may perform a cropping based on a location of the shifted target region within the video.

Regarding this, referring to <301>, a mobile terminal may extract a face region 310 and a text region 320 as target regions from an image in the course of playing a video. Referring to <302>, a mobile terminal may set a region 330 including a movement in the course of playing an image as a target region. Referring to <303>, a mobile terminal may recognize a region, from which a movement of a person or ball is sensed in the course of playing a video related to a sports game, as a target region. Referring <304>, a mobile terminal may recognize a plurality of faces 350 included in an image as a target region in the course of playing an image related to closed circuit TV (CCTV).

Meanwhile, once a target region is set, when a size of a first region on which a video is played is reduced, a mobile terminal may control a target region to be mainly outputted. This is described with reference to embodiments shown in FIGS. 5 to 11.

Figure 4:
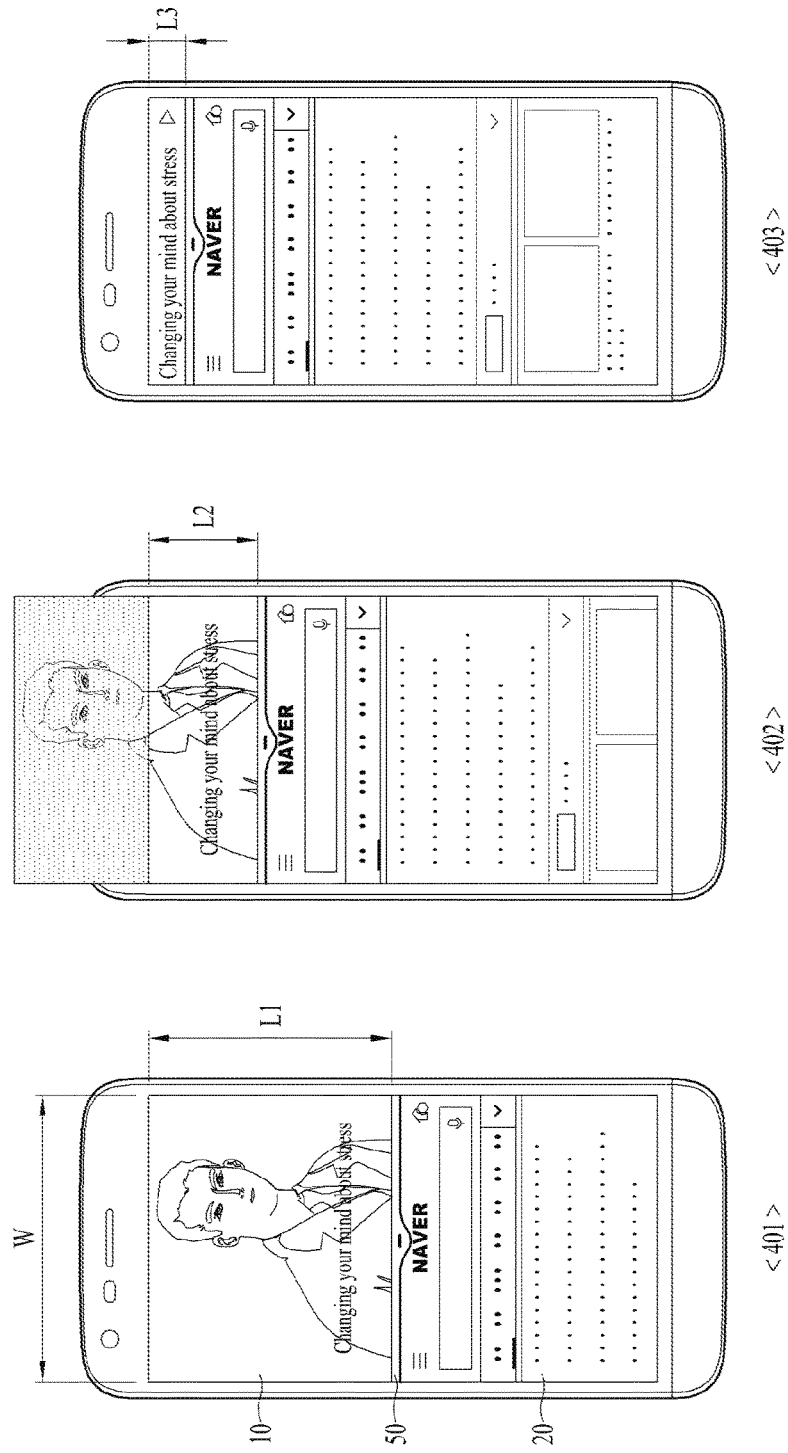
FIG. 4 is a diagram showing one example of controlling a size of a video play region on a screen split interface of a mobile terminal according to one embodiment of the present invention.

FIG. 4 is a diagram showing one example of controlling a size of a video play region on a screen split interface of a mobile terminal according to one embodiment of the present invention.

If a screen split interface is outputted, a mobile terminal may output a first region 10 and a second region 20 to a display. If the screen split interface is outputted initially, a size of the first region 10 or the second region 20 may be outputted in basic size W×L1 (width by length). The screen split interface may include a split indicator 50 for dividing the display into the first region 10 and the second region 20 and adjusting sizes of the first region 10 and the second region 20. For instance, the split indicator 50 may be outputted in shape of a bar, by which the present invention is non-limited.

According to a setting of the mobile terminal or a user's control, when an image is played on the screen split interface, the image may be outputted to the first region 10 or the second region 20. According to the present invention, the image is assumed as outputted from the first region. And, it is apparent that the image can be outputted from the second region 20 instead of the first region 10. While the image is outputted from the first region 10, a running screen of a different application may be outputted from the second region 20. And, a video outputted from the first region 10 may include one of various images of a currently broadcasted program, a previously broadcasted program, a movie, a music video, a documentary and the like.

Referring to <401>, if an image is initially played on the screen split interface, the mobile terminal may output the image in a first size. Particularly, in the present invention, if an image is initially played, a size of the image may be outputted in size corresponding to a width size W and a length size L1 of the first region 10. For instance, the width size and the length size may correspond to an optimal ratio for an image output from the first region 10 of the screen split interface. In the present invention, the first size is assumed as a default size of an image playback on the screen split interface.

Referring to <402>, if a size of one size of the image played first region 10 is reduced into a first length range, the mobile terminal may output the image in a second size to the first region 10. For instance, the first length range is a size smaller than the default size and corresponds to a length greater than a second length range. Regarding this, the mobile terminal may crop a portion of a play screen and then output it to the first region 10, while a ratio for playing the image is maintained equal to the first size. If a size of one side of the first region in the second size is greater than that of one side of a target region, an ambient region may be cropped as well as the target region. For instance, in <402>, since a height length of a caption is smaller than L2, the mobile terminal may crop a partial region above a top of the caption and a partial region below a bottom of the caption as well. Hence, the width size of the image played first region 10 is maintained as W intact and the height size thereof may be changed into L2.

On the other hand, if a width size of the other side of the image played first region 10 is reduced into the first length range, the mobile terminal may crop a partial region from a video in the first size and then output it to the first region 10 [not shown in <402>]. In this case, the height size of the video may be maintained intact.

Referring to <403>, if a size of one side of the image played first region 10 is reduced into the second length range, the mobile terminal may control a controller or text information to be outputted in width without outputting the image to the first region 10. In doing so, a width size of the size of the first region 10 may be maintained as W intact. Herein, the second length range corresponds to a size smaller than the first length range as well as the default size. For instance, text information may correspond to program information, real-time comment, caption, lyrics, sports commentary, or the like. And, the controller may include a play button, a stop button, a search button and the like.

Meanwhile, if a height size corresponding to the other side of the image played first region 10 is reduced into the second length range, the mobile terminal may output the controller or text in height [not shown in <403>].

Moreover, if the height size of the first region 10 is reduced into a third length range, the mobile terminal stops outputting the screen split interface and may output the running screen of the application outputted to the second region 10 as a full screen [not shown in FIG. 4]. Herein, the third length range is a size smaller than the second length range as well as the first length range and may correspond to a size not enough to output the text or controller.

Meanwhile, described in the present invention is a case of outputting a screen split interface in the course of using a mobile terminal in portrait mode. And, the following embodiment may equally apply to a case of outputting a screen split interface in the course of using a mobile terminal in landscape mode. In this case, as the screen split interface moves right and left, a width size of a video played first region may be changed and a height size may be maintained in default size.

Change of Play Region by Size Adjustment of Screen Split Interface

A method of efficiently outputting an image or information corresponding to the image to the first region 10 according to the size adjustment of the first region 10 is described with reference to FIGS. 5 to 11 as follows.

In the embodiments shown in FIGS. 5 to 11, a control input for size adjustment of the first and second regions 10 and 20 on the screen split interface is assumed as a drag & drop touch input to the split indicator 50. Yet, it is apparent that the control input can include various input methods as well as the drag & drop touch input. In the following embodiment, a video is assumed as outputted from the first region 10 and a case of reducing an image into a size smaller than a basic size by a control input is described. Moreover, a height size of the first region 10 is assumed as changed in response to a control input.

Figure 5:
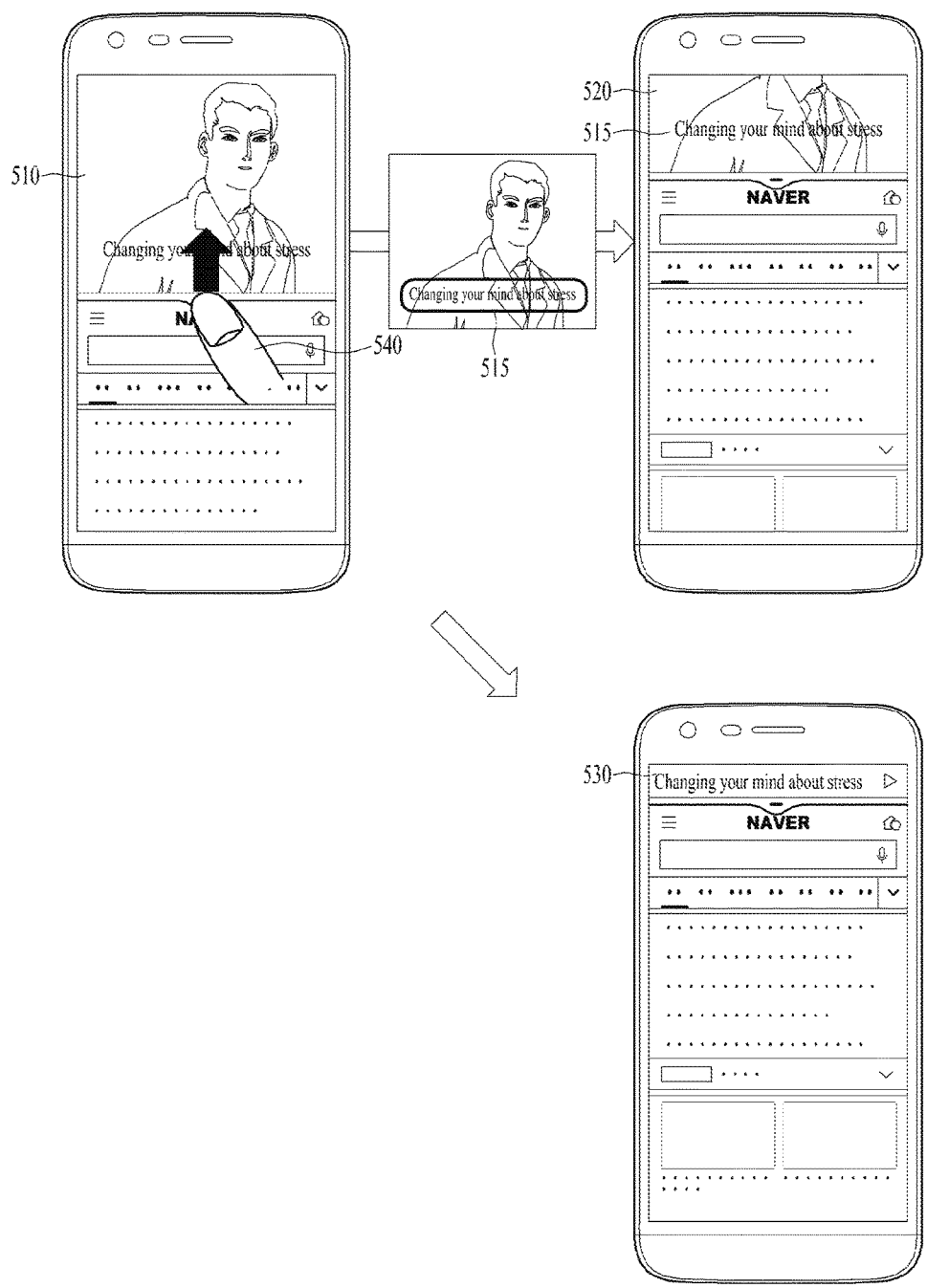
FIG. 5 is a diagram showing one example of adjusting a size of an image on a screen split interface of a mobile terminal according to one embodiment of the present invention.

FIG. 5 is a diagram showing one example of adjusting a size of an image on a screen split interface of a mobile terminal according to one embodiment of the present invention.

Particularly, an embodiment shown in FIG. 5 shows a method of reducing an image played region with reference to a text. In the embodiment shown in FIG. 5, the description of the substance redundant with that of FIG. 4 shall be omitted.

Referring to a first diagram of FIG. 5, the mobile terminal may output the screen split interface to the display. An image may be played in the first region 10 of the screen split interface. For instance, the image played in the embodiment shown in FIG. 5 is an image played in a language different from a language set for the mobile terminal and corresponds to a caption included case. In doing so, the mobile terminal may output the image in a first size 510 to the first region 10. Herein, as mentioned in the foregoing description with reference to FIG. 4, the first size corresponds to a default size having a width length W and a height length L1.

The mobile terminal may sense a control input 540 to the split indicator. For instance, the control input 540 may correspond to a drag & drop touch input intending to reduce a size of the first region 10. Particularly, the control input 510 may correspond to an input for intending to reduce a size of one of the width size and the height size of the first region 10.

First of all, if the control input 540 is sensed, the mobile terminal may extract a target region 515 from a currently played region. For instance, if a text is included in an image, the mobile terminal may set the target region 515 as a text outputted region. For another instance, if a face and text are included in the image, the mobile terminal may set the target region 515 as a face and text outputted region. In case of the embodiment shown in FIG. 5, the image is played in a language different from a language set for the mobile terminal. And, the mobile terminal may set the target region to a text region by prioritizing the text region rather than a text region. The reason for this is that a caption for a user of the mobile terminal should be preferentially provided. If the target region 515 is extracted, the mobile terminal may adjust a size of the first region 10 and a size of the played image according to a drop point of a drag & drop touch input.

For instance, if a height size of the first region 10 adjusted according to the control input 540 is the first length range, the mobile terminal may output the first region 10 in a manner of reducing a size of the first region 10 into a second size 520. As described in FIG. 4, the second size 520 may correspond to a case that a width size of the second size 520 is equal to that of the first size 510 and that a height size of the second size 520 is smaller than that of the first size 510. The image in the second size 520 may correspond to an image cropped from the image in the first size 510 centering on the target region. Hence, if the height size is reduced within the first length range, the image in the second size 520 may be reduced into a size eventually including a target region only from a size including the target region and an ambient region. Through this, even if the size of the first region 10 is reduced smaller than a default size, a user can continue to use a caption corresponding to a feature of the image.

For another instance, referring to a third diagram of FIG. 5, if the height size of the first region 10 adjusted according to the control input 540 is the second length range, the mobile terminal may reduce and output a size of the first region 10 into a third size 530. As described in FIG. 4, the third size 530 may correspond to a case that a width size of the third size 530 is equal to that of the second size 520 as well as the first size 510 and that a height size of the third size 530 is smaller than that of the second size 520. And, the third size 530 may correspond to a size impossible to output an image due to the limited height size. Moreover, the third size 530 may correspond to a size capable of outputting a caption or a simple controller only instead of an image.

In response to the control input 540, the mobile terminal may output the first region 10 in the third size 530 and also output a caption with the first region 10. If the region 10 is outputted in the third size 530, the mobile terminal does not crop and output a portion of the image. Instead, the mobile terminal may output a caption that is a text corresponding to the target region 515 to the first region. Through this, although the size of the first region 10 is reduced into a size, in which an image is not viewable at all, the user may continue to use the caption corresponding to the substance of the image.

Meanwhile, while the first region 10 is outputted in the second or third size, if a drag & drop touch input applied in a direction opposite to that of the control input 540 is sensed, the mobile terminal may output the first region 10 in the first size again.

Figure 6:
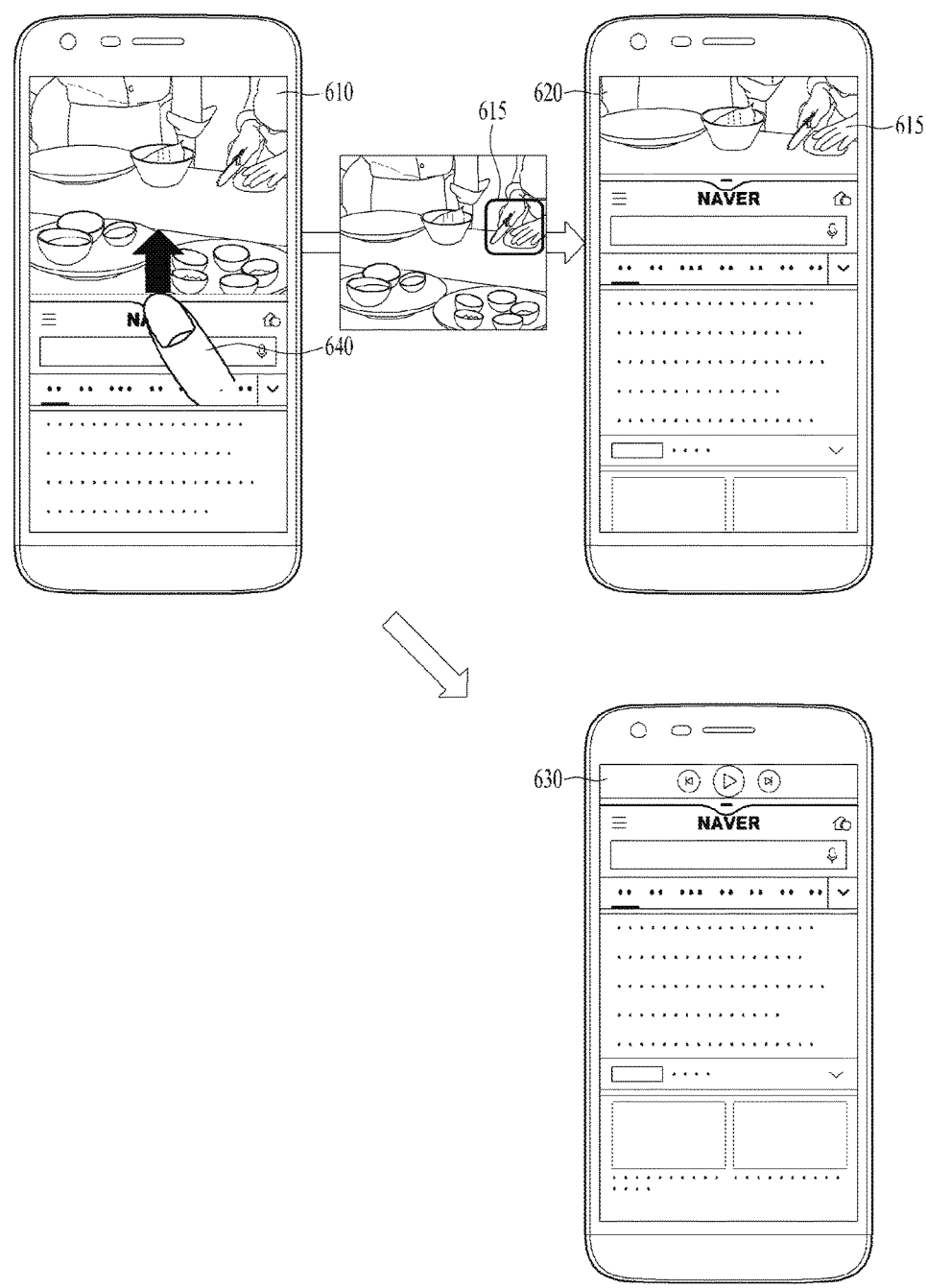
FIG. 6 is a diagram showing another example of adjusting a size of an image on a screen split interface of a mobile terminal according to one embodiment of the present invention.

FIG. 6 is a diagram showing another example of adjusting a size of an image on a screen split interface of a mobile terminal according to one embodiment of the present invention.

Particularly, an embodiment shown in FIG. 6 shows a method of reducing an image played region with reference to a movement region. In the embodiment shown in FIG. 6, the description of the substance redundant with that of FIG. 4 or FIG. 5 shall be omitted.

Referring to a first diagram of FIG. 6, the mobile terminal may output the screen split interface to the display. An image 610 may be played in the first region 10 of the screen split interface. For instance, the image played in the embodiment shown in FIG. 6 is a cooking program image, in which a cooking figure may continue to be included. And, the mobile terminal may output the cooking program image in a first size 610 to the first region 10. Herein, as mentioned in the foregoing description with reference to FIG. 4, the first size corresponds to a default size having a width length W and a height length L1. The mobile terminal may sense a control input 640 to the split indicator.

First of all, if the control input 640 is sensed, the mobile terminal may extract a target region 615 from a currently played region. For instance, if a still region and a movement region are included in an image, the mobile terminal may extract the movement region as the target region 615. In the embodiment shown in FIG. 6, a cooking image includes a food source as the still region and also includes a cooking figure as the movement region. Hence, the mobile terminal can set the target region 615 to the movement region including the cooking feature corresponding to the feature of the cooking image. If the target region 615 is extracted, the mobile terminal may adjust a size of the first region 10 and a size of the played image according to a drop point of a drag & drop touch input.

Meanwhile, if a currently played image is a makeup image, the mobile terminal may extract a makeup tool or hand overlaid region on a face region as the target region [not shown in FIG. 6]. If a currently played image is a product-making image, the mobile terminal may extract a region, which shows that a person is actually making a product, as the target region 615 from a full image. If a currently played image is an image for describing a method of utilizing a tool, the mobile terminal may extract a person's hand and tool included image as the target region 615 from the full image.

For instance, if a height size of the first region 10 adjusted according to the control input 640 is the first length range, the mobile terminal may output the first region 10 in a manner of reducing a size of the first region 10 into a second size 620. The image in the second size 620 may correspond to an image cropped from the image in the first size 610 centering on the movement region that is the target region. Through this, even if the size of the first region 10 is reduced smaller than a default size, a user can continue to use the cooking figure corresponding to a feature of the image.

For another instance, if the height size of the first region 10 adjusted according to the control input 640 is the second length range, the mobile terminal may reduce and output a size of the first region 10 into a third size 630. And, the third size 630 may correspond to a size incapable of cropping and outputting a portion of the image due to the limited height size. Hence, the third size 630 may correspond to a size capable of outputting a play controller only instead of a portion of the image. In this case, the mobile terminal may output the play controller of the cooking image to the first region 10 while continuing to output audio of the cooking image. Through this, although the size of the first region 10 is reduced into a size, in which an image is not viewable at all, the user may be provided with the audio and may also use the controller capable of adjusting a play timing or view of an image.

Figure 7:
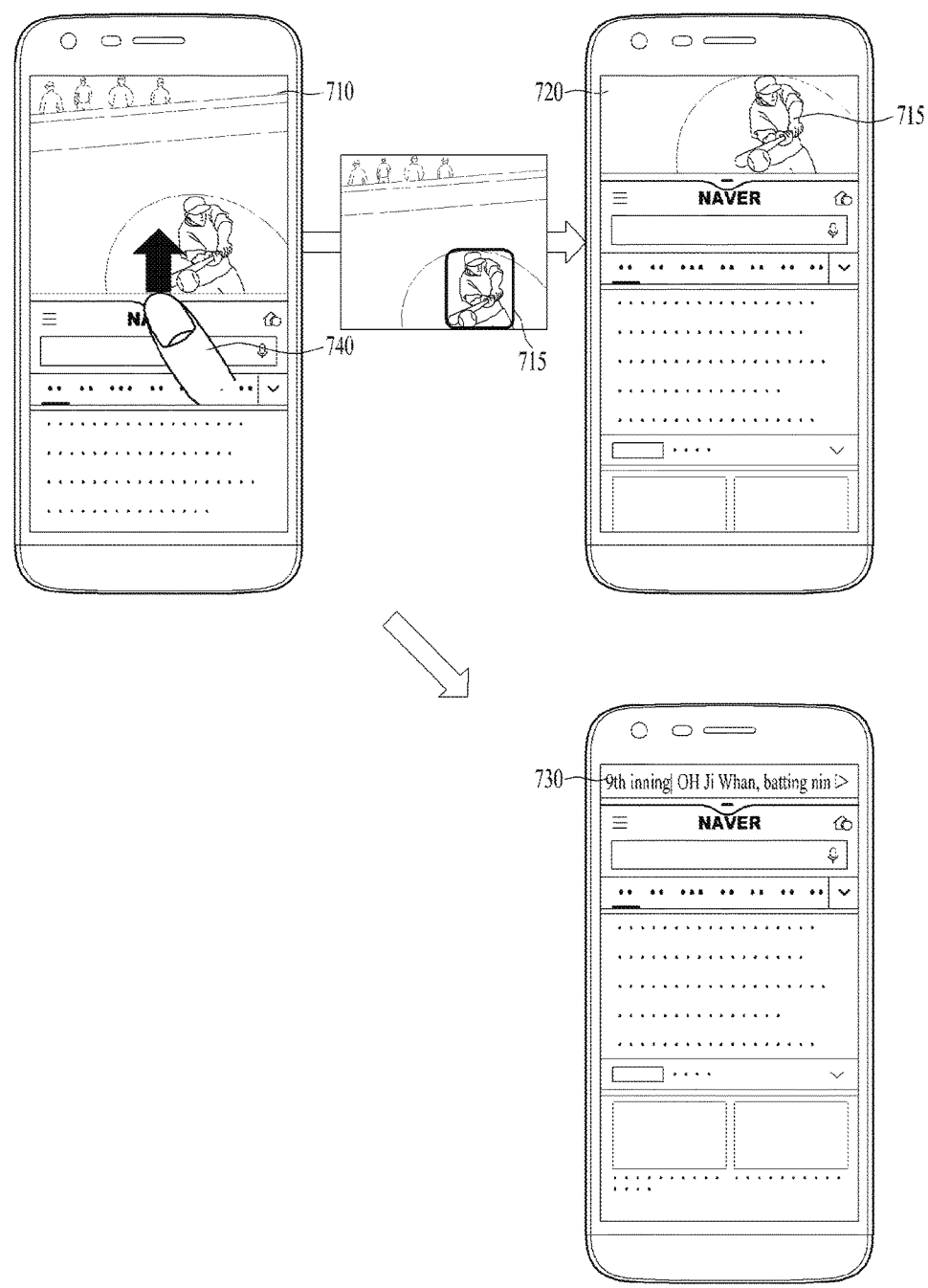
FIG. 7 is a diagram showing another example of adjusting a size of an image on a screen split interface of a mobile terminal according to one embodiment of the present invention.

FIG. 7 is a diagram showing another example of adjusting a size of an image on a screen split interface of a mobile terminal according to one embodiment of the present invention.

Particularly, an embodiment shown in FIG. 7 shows a method of reducing an image played region with reference to a movement. In the embodiment shown in FIG. 7, the description of the substance redundant with that of FIG. 4 or FIG. 5 shall be omitted.

Referring to a first diagram of FIG. 7, the mobile terminal may output the screen split interface to the display. A sports image may be played in the first region 10 of the screen split interface. For instance, the sports image outputted from the first region 10 may correspond to a baseball game. And, the mobile terminal may output a baseball game image in a first size 710. Moreover, the mobile terminal may sense a control input 740 to the split indicator.

If the control input 740 is sensed, the mobile terminal may extract a target region 715 from a currently played video region. For example, if a player's movement region and a ball's movement region are included in the baseball game image, the mobile terminal may extract a plurality of regions as target regions. For instance, from a single person's movement included game image of baseball, golf or the like, the player's movement region and the ball's movement region may be extracted as the target regions. For another example, if the player's movement region and the ball's movement region are included in the baseball game image, the mobile terminal may extract ball's movement region, which is relatively important to win the game, as the target region. For instance, in a game of soccer, basketball, volleyball or the like, in which a plurality of persons are included, a ball's movement region may become a target region instead of a player's movement region. If the target region 715 is extracted, the mobile terminal may adjust a size of the first region 10 and a size of the played image according to a drop point of a drag & drop touch input.

For example, if a height size of the first region 10 adjusted according to the control input 740 is the first length range, the mobile terminal may output the first region 10 in a manner of reducing a size of the first region 10 into a second size 720. The image in the second size 720 may correspond to an image of a region outputted by being cropped from the image in the first size 710 centering on the target region. Through this, even if the size of the first region 10 is reduced smaller than a default size, a user may have no problem in watching a game progress situation.

For another example, if the height size of the first region 10 adjusted according to the control input 740 is the second length range, the mobile terminal may reduce and output a size of the first region 10 into a third size 730. And, the third size 730 may correspond to a size incapable of outputting the game image due to the limited height size. Moreover, the third size 730 may correspond to a size capable of outputting a text or controller instead of a portion of the image.

Hence, in response to the control input 740, the mobile terminal may output the size of the first region 10 in the third size 730 and also output a text indicating real-time game information within the first region 10. And, the mobile terminal may continue to output audio of the game while outputting the text. Through this, although the size of the first region 10 is reduced into a size, in which an image is not viewable at all, the user may recognize a game situation through the text. Meanwhile, the mobile terminal may output a controller for controlling a play timing or view of the image to the first region 10 in the third size 730 instead of the text.

Figure 8:
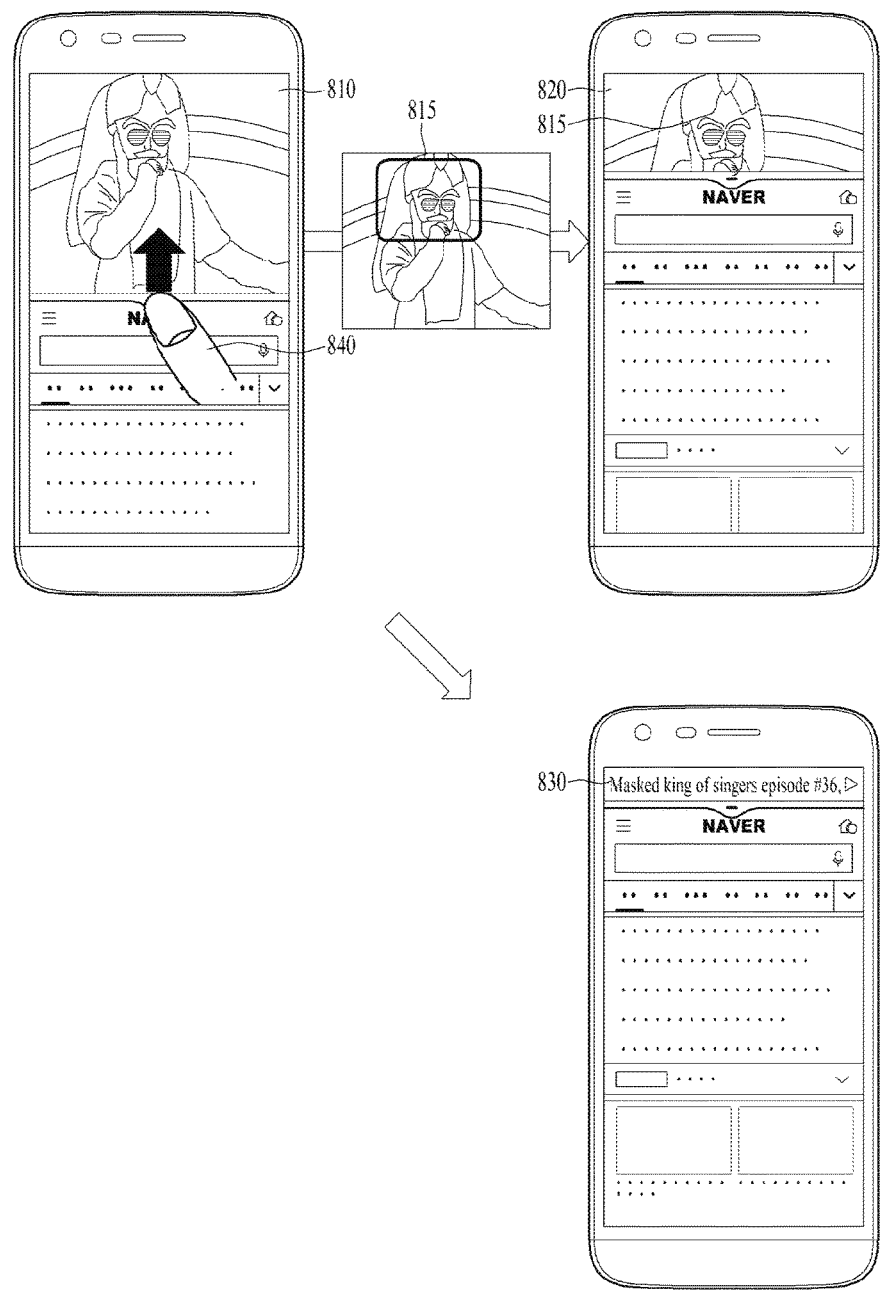
FIG. 8 is a diagram showing another example of adjusting a size of an image on a screen split interface of a mobile terminal according to one embodiment of the present invention.

FIG. 8 is a diagram showing another example of adjusting a size of an image on a screen split interface of a mobile terminal according to one embodiment of the present invention.

Particularly, an embodiment shown in FIG. 8 shows a method of reducing an image played region with reference to a face region. In the embodiment shown in FIG. 8, the description of the substance redundant with that of FIG. 4 or FIG. 5 shall be omitted.

Referring to a first diagram of FIG. 8, the mobile terminal may play an image including at least one person in the first region 10 of the screen split interface. For instance, the image including the at least one person may include various images such as a music broadcast, a music video, a speech, a debate and the like. In the embodiment of FIG. 8, while a music broadcast is outputted in a first size 810 to the first region 10, the mobile terminal may sense a control input 840 to the split indicator.

If the control input 840 is sensed, the mobile terminal may extract a target region 815 from a currently played. For example, in the embodiment shown in FIG. 8, if a single singer is included in a music broadcast image, the mobile terminal may extract a singer's face located region as a target region. If a plurality of singers are included in the music broadcast image, the mobile terminal may extract a face region located at a center of the image as a target region from a plurality of recognized faces. If the target region 815 is extracted, the mobile terminal may adjust a size of the first region 10 and a size of the played image based on a drop point of a drag & drop touch input.

For example, if a height size of the first region 10 adjusted according to the control input 840 is the first length range, the mobile terminal may output the first region 10 in a manner of reducing a size of the first region 10 into a second size 820. Herein, if the size of the first region 10 is reduced into the second size 820 from the first size 810, a region currently played in the first region 10 may correspond to a region cropped to fit the second size 820 centering on the target region and. Referring to a second drawing of FIG. 8, a music broadcast image can be played centering of singer's face region in the first region 10 reduced into the second size 820. Through this, even if the size of the first region 10 is reduced smaller than a default size, a user can watch the corresponding image by checking a singer currently singing a song.

For another example, if the height size of the first region 10 adjusted according to the control input 840 is the second length range, the mobile terminal may reduce and output a size of the first region 10 into a third size 830. As the third size 830 corresponds to a size incapable of outputting the image due to the limited height size, the third size 830 may correspond to a size capable of outputting a text or controller only instead of the image.

Hence, in response to the control input 840, the mobile terminal may output the size of the first region 10 in the third size 830 and also output a text indicating real-time information of the music broadcast within the first region 10. In doing so, the mobile terminal may continue to output audio of the music broadcast despite outputting the text instead of the image. Through this, although the size of the first region 10 is reduced into a size, in which an image is not viewable at all, the user may recognize a corresponding situation through the text and sound.

Meanwhile, while a video is outputted in the first size 810, if a size of a person included in the video is small, a full or upper body of the person included in the video may be set as a target region.

Figure 9:
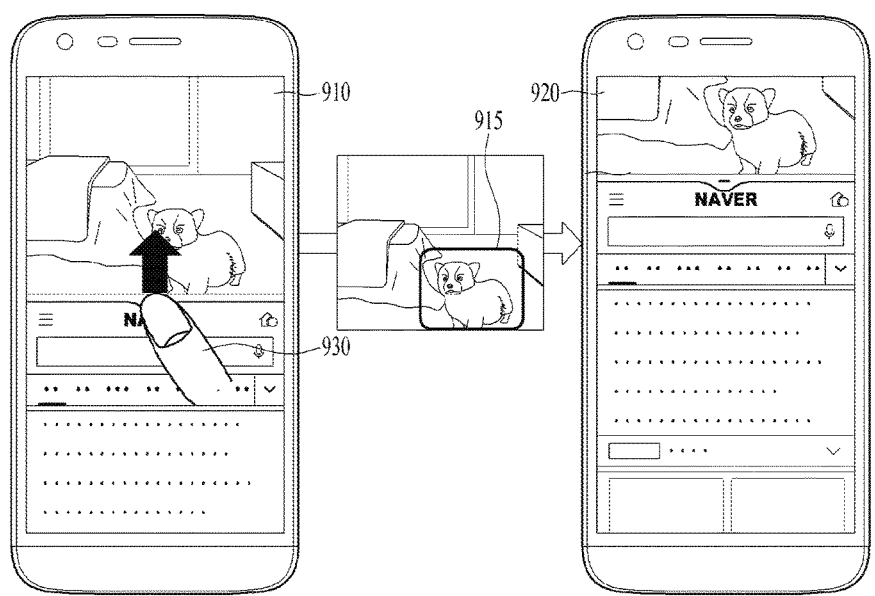
FIG. 9 is a diagram showing another example of adjusting a size of an image on a screen split interface of a mobile terminal according to one embodiment of the present invention.

FIG. 9 is a diagram showing another example of adjusting a size of an image on a screen split interface of a mobile terminal according to one embodiment of the present invention.

Particularly, an embodiment shown in FIG. 9 shows a method of reducing an image played region with reference to a moving object. In the embodiment shown in FIG. 9, the description of the substance redundant with that of FIG. 4 or FIG. 8 shall be omitted.

Referring to a first diagram of FIG. 9, the mobile terminal may output a closed circuit TV (CCTV) image to the first region 10 of the screen split interface. For instance, the embodiment of FIG. 9 corresponds to a case for a user, who is not at home but outside home, to intend to be informed of a pet dog or intruder through CCTV installed at home. In case of outputting the CCTV image to the first region 10 of the screen split interface, the mobile terminal may output it in the first size 910. And, the mobile terminal may sense a control input 930 to the split indicator.

If the control input 930 is sensed, the mobile terminal may extract a target region 915 from a currently played video. For example, if a movement of a pet dog is sensed from the CCTV image, the mobile terminal may set a region containing the pet dog, which is a moving object, as the target region 915 and then extract it. In case of the moving object, since a region in an image is irregular, a target region extracted location in the video may be changed in response to a movement of the object in the image. If the target region 915 is extracted, the mobile terminal may adjust a size of the first region 10 and a size of the played image based on a drop point of a drag & drop touch input.

Referring to a second diagram of FIG. 9, if a height size of the first region 10 adjusted according to the control input 930 is the first length range, the mobile terminal may output the first region 10 in a manner of reducing a size of the first region 10 into a second size 920. The image in the second size 920 may correspond to an image resulting from cropping a region from the image in the first size 910 centering on the moving object which is the target region and then outputting the cropped region. Through this, even if the size of the first region 10 is reduced smaller than a default size, a user can easily recognize a situation inside a house.

Figure 10:
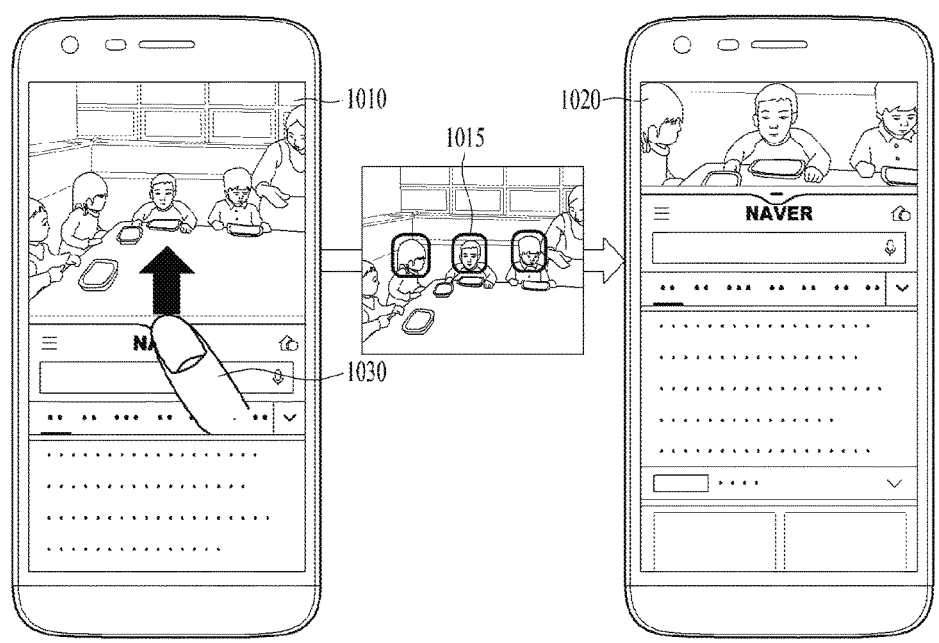
FIG. 10 is a diagram showing another example of adjusting a size of an image on a screen split interface of a mobile terminal according to one embodiment of the present invention.

FIG. 10 is a diagram showing another example of adjusting a size of an image on a screen split interface of a mobile terminal according to one embodiment of the present invention.

Particularly, an embodiment shown in FIG. 10 shows a method of reducing an image played region with reference to a specific face if a plurality of faces are recognized from an image including a plurality of persons. In the embodiment shown in FIG. 10, the description of the substance redundant with that of FIG. 4 or FIG. 9 shall be omitted.

Referring to a first diagram of FIG. 10, the mobile terminal may output an image including a plurality of persons to the first region 10 of the screen split interface. For instance, the image outputted from the first region 10 may correspond to a family gathering image, a kindergarten CCTV image, a friend gathering, or the like. If an image is initially outputted to the screen split interface, it may be outputted in a first size 1010. And, the mobile terminal may sense a control input 1030 to the split indicator.

If the control input 1030 is sensed, the mobile terminal may extract a target region 1015 from a currently played video. Herein, if a plurality of persons are included in the image, the mobile terminal may set the target region 1115 according to a preset reference. For instance, if a face saved to contacts is recognized from a plurality of the persons, a face region corresponding to the face saved to the contacts may be set as the target region 1115. For example, if a person (e.g., family member) of an image included in a gallery of the mobile terminal multiple times is recognized from a plurality of the persons, the mobile terminal may set a face region of the corresponding person as the target region 1115. For example, if information on a plurality of the persons does not exist in the mobile terminal, the mobile terminal may set a face region of a person located at the center as the target region.

Meanwhile, if objects included in a video belong to the same species or different species, the mobile terminal may set the target region 1015 by differentiating priorities. For instance, if objects included in a video belong to the same species, the mobile terminal may set a region, in which all of the objects are included, as the target region 1015. For example, if objects included in the video belong to the different species, the mobile terminal may set the target region 1015 to the species of the high priority. Herein, a person is assumed as having a high priority and an animal is assumed as having a low priority.

In the embodiment shown in FIG. 10, in a state that the faces of a plurality of the persons are recognized, assume that a face region located at the most center is set as the target region 1015. Or, if an indicator indicating that the faces of a plurality of the persons are recognized is outputted, if a control input to the indicator is sensed, the control input sensed face region may be set as the target region 1015 [not shown in FIG. 10]. When a plurality of the faces are entirely included, if a size of the first region 1010 is reduced, it becomes difficult for a user to recognize faces. If the target region 1015 is extracted, the mobile terminal may adjust a size of the first region 10 and a size of the played image based on a drop point of a drag & drop touch input.

In doing so, referring to a second diagram of FIG. 10, if a height size of the first region 10 is the first length range, the mobile terminal may output the first region 10 in a manner of reducing a size of the first region 10 into a second size 1020. As the first region is reduced into the second size 1020, a region is cropped centering on the target region 1015 in the first size 1010 and the cropped target region 1015 may be outputted in the second size 1020. Through this, even if the size of the first region 10 is reduced smaller than a default size, a user can easily recognize a desired object.

Figure 11:
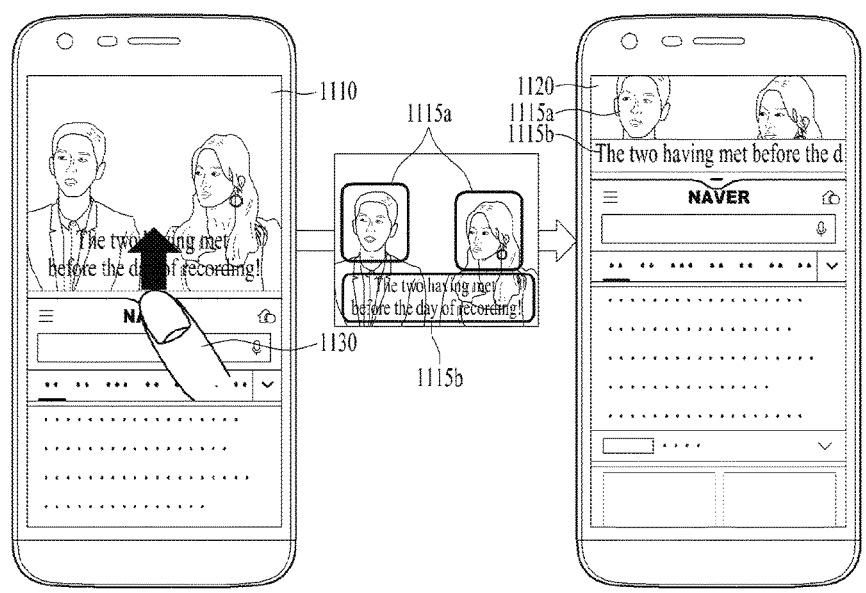
FIG. 11 is a diagram showing another example of adjusting a size of an image on a screen split interface of a mobile terminal according to one embodiment of the present invention.

FIG. 11 is a diagram showing another example of adjusting a size of an image on a screen split interface of a mobile terminal according to one embodiment of the present invention.

Particularly, an embodiment shown in FIG. 11 shows a method of reducing an image with reference to a face and caption. In the embodiment shown in FIG. 11, the description of the substance redundant with that of FIG. 4 and FIG. 5 shall be omitted.

Referring to a first diagram of FIG. 11, the mobile terminal may output a broadcast image to the first region 10 of the screen split interface. In doing so, the broadcast image is assumed as corresponding to a case that person's conversation and caption are considerably outputted like a talk show or an entertainment program. And, the mobile terminal may output the broadcast image in a first size 1110. Moreover, the mobile terminal may sense a control input 1130 to the split indicator.

If the control input 1130 is sensed, the mobile terminal may extract a target region 1115 from a currently played video. For instance, since the substance included in the caption is important to a talk show image or an entertainment program image as well as acts of cast members, both of the cast member and the caption may be extracted as target regions. In the embodiment shown in FIG. 11, a face region corresponding to the cast member is set as a first target region 1115*a* and a caption region is set as a second target region 115*b*. If the target regions 1115*a* and 1115*b* are set, the mobile terminal may adjust a size of the first region 10 and a size of the played image based on a drop point of a drag & drop touch input.

Referring to a second diagram of FIG. 11, if a height size of the first region 10 adjusted according to the control input 1130 is the first length range, the mobile terminal may output the first region 10 in a manner of reducing a size of the first region 10 into a second size 1120. As the size of the first region 10 is reduced into the second size 1120, the mobile terminal may crop the first and second target regions 1115*a* and 1115*b* from the image, synthesize a plurality of the cropped target regions, and output the synthesized region to the first region 10. Through this, even if the size of the first region 10 is reduced smaller than a default size, a user can quickly recognize an important progress situation of the entertainment program.

Change of Play Region Due to Cause Other than Control Input

In the following embodiments shown in FIGS. 12 to 16, described is a case that sizes of a region and image are changed due to a cause other than a size change of a first region according to user's drag & drop touch input.

Figure 12:
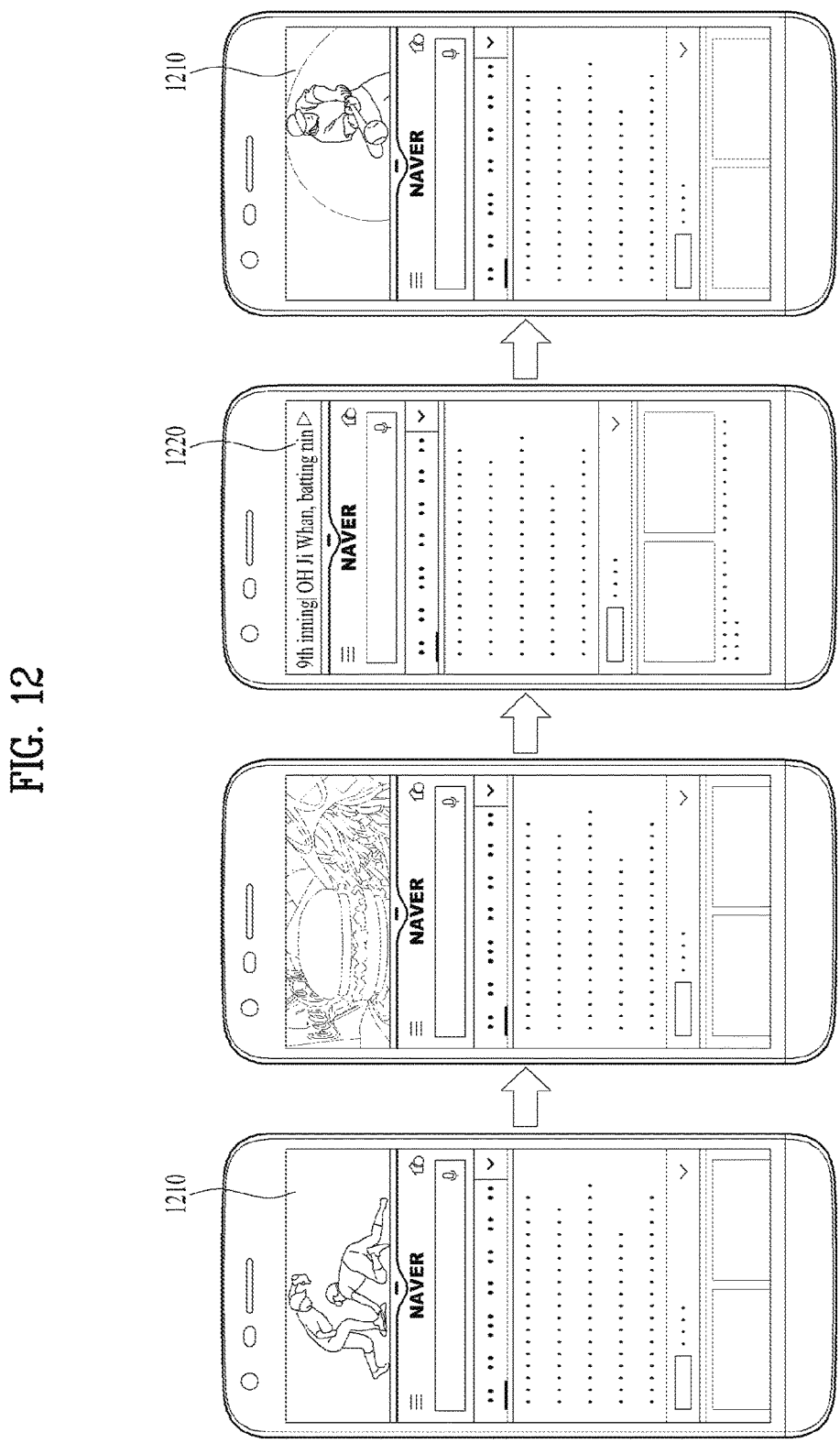
FIG. 12 is a diagram showing one example of automatically adjusting a size of an image on a screen split interface of a mobile terminal according to one embodiment of the present invention.

FIG. 12 is a diagram showing one example of automatically adjusting a size of an image on a screen split interface of a mobile terminal according to one embodiment of the present invention. In the embodiment shown in FIG. 12, the description of the substance redundant with that of FIG. 4 and FIG. 5 shall be omitted.

Referring to a first diagram of FIG. 12, the mobile terminal may output a baseball game image to the first region 10 of the screen split interface. In doing so, the image outputted to the first region may correspond to a program (e.g., entertainment program, movie, etc.) televised through a television as well as a baseball game, a soccer game or the like. The mobile terminal may output the baseball game image to be played in a second size 1210. For instance, the embodiment of FIG. 12 corresponds to a case that a size of the image is reduced into the second size 1210 from a default size by user's control input, or may include a case of playing the image in a first size 1210.

Referring to a second diagram of FIG. 12, the mobile terminal may play an advertisement image during a break of the baseball game in the course of playing the baseball game image. For instance, this may correspond to a case that an advertisement is broadcasted between parts of a drama, an entertainment program, a movie, or the like. In this case, as shown in a third drawing of FIG. 12, the mobile terminal recognizes that a received broadcast signal is an advertisement and then reduces the first region into a third size 1220. Since an advertisement broadcast is not an image desired to be watched by a user, a region occupying the display can be reduced and an application currently run in the second region 20 can be used more conveniently. If the image is reduced into the third size 1220, the mobile terminal may output information of the currently broadcasted game image.

Thereafter, if the baseball game is resumed, as shown in a fourth diagram of FIG. 12, the mobile terminal may control the baseball game image to be played in the second size 1210 that is the size of the originally outputted first region.

Figure 13:
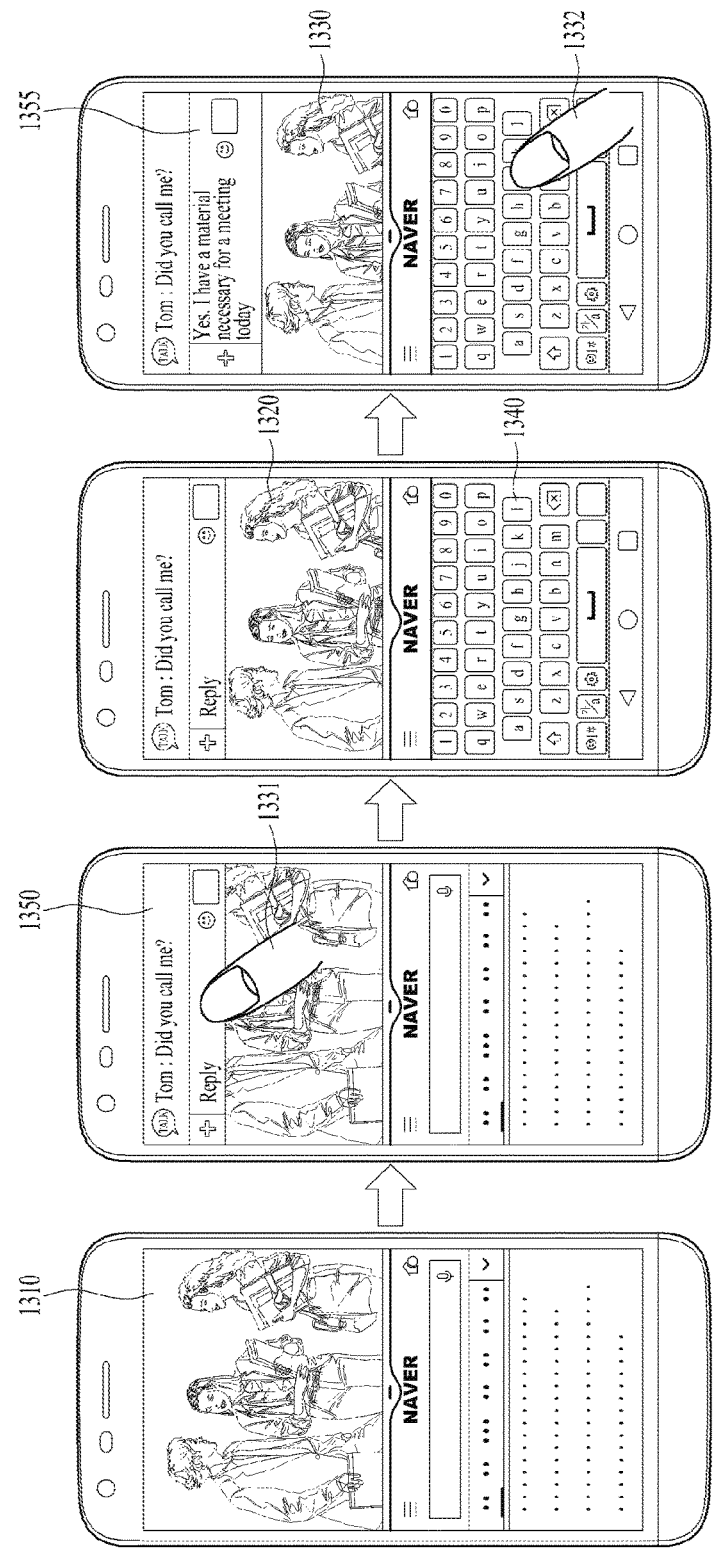
FIG. 13 is a diagram showing one example of automatically adjusting a size of a region in case of occurrence of an event in the course of a video play in a mobile terminal according to one embodiment of the present invention.

FIG. 13 is a diagram showing one example of automatically adjusting a size of a region in case of occurrence of an event in the course of a video play in a mobile terminal according to one embodiment of the present invention. In the embodiment shown in FIG. 13, the description of the substance redundant with that of FIG. 4 and FIG. 5 shall be omitted.

Referring to a first diagram of FIG. 13, the mobile terminal may output a broadcast image to the first region 10 of the screen split interface. Herein, the outputted image may apparently include all the former images played in the aforementioned embodiments as well as the broadcast image. And, the mobile terminal may output the broadcast image in the first size 1310.

The mobile terminal may receive an occurrence of an event. For instance, the occurring event may include one of various notifications (e.g., notifications of text message reception, alarm occurrence, call reception, email reception, application, etc.) occurring inside or outside the mobile terminal. In the embodiment of FIG. 13, assume that the occurring event is a text message reception. The mobile terminal may output a received text message 1350 with which the broadcast image is overlaid. In doing so, the mobile terminal may sense a first control input 1331 for sending a reply to the text message. For instance, the first control input 1331 may correspond to a short touch input to a reply button.

In response to the first control input, as shown in a third drawing of FIG. 13, the mobile terminal reduces a size of the first region 10 into a second size 1320 and may control a target region of the image to be outputted. In the embodiment of FIG. 13, the target region is assumed as a face region of a hero. Namely, the mobile terminal may crop a region from the image in the first size 1310 centering on a face region and then output the cropped face region to the region in the second size 1320. In doing so, in response to the first control input 1331, the mobile terminal may output a keypad region 1340 to the second region 20 to be overlaid with the keypad region 1340.

Referring to a fourth drawing of FIG. 13, in response to a second control input 1332 to the keypad region 13340, the mobile terminal may output a reply region 1355 of a text message. If a count of the second control input 1332 increases, a size of the reply region 1355 may increase. In this case, the mobile terminal may control the existing image outputted in the second size 1320 to be outputted in a manner 1330 of being further reduced. Herein, the size of the reduced first region may be smaller than the second size 1320 and greater than a third size (not shown). Through this, a user may continue to check an important part of the currently played image while coping with the occurring event.

Meanwhile, as the size of the reply region 1355 of the text message increases, if the size of the image is reduced up to the third size, as described above, the mobile terminal may output a controller or text information instead of the image and continue to output audio [not shown in FIG. 13].

Figure 14:
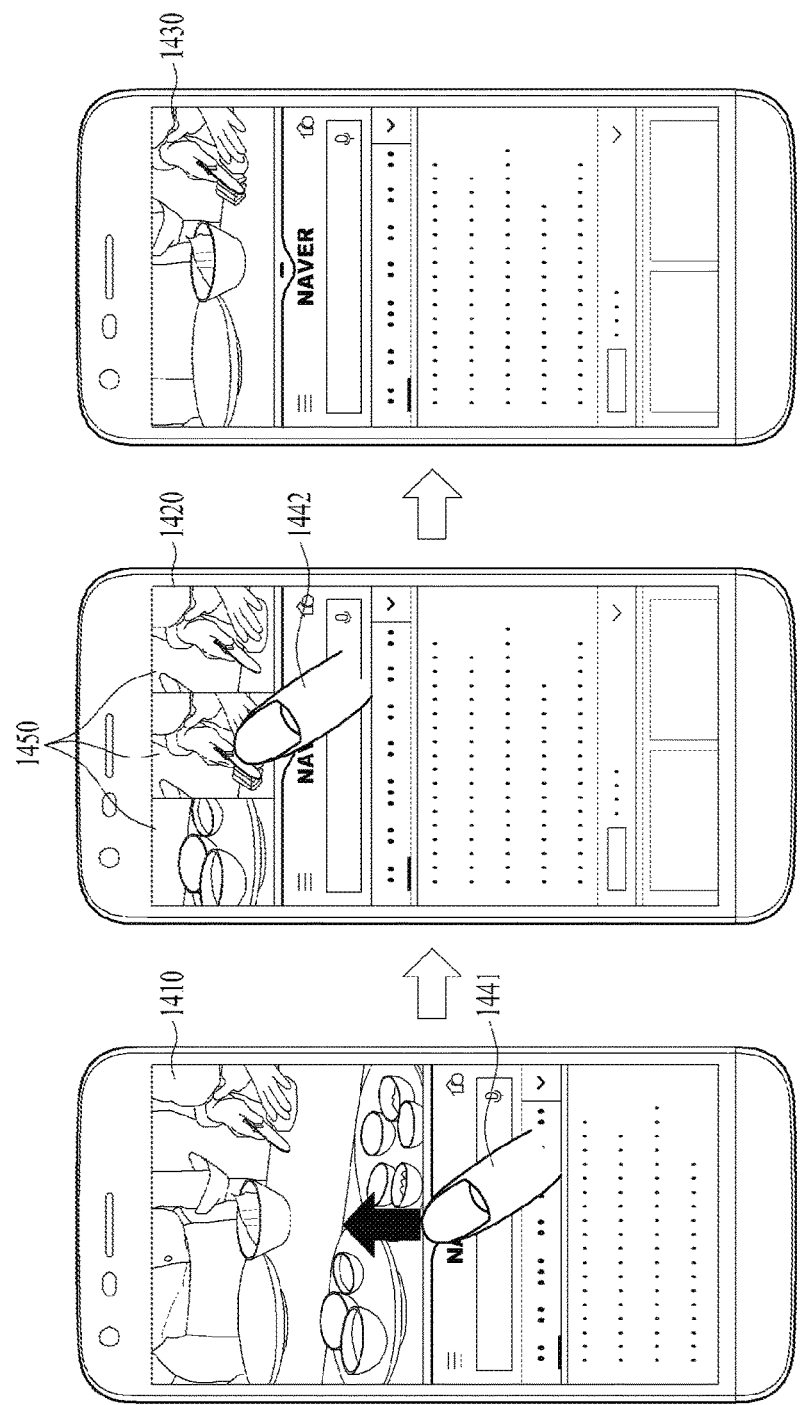
FIG. 14 is a diagram showing one example of providing a replay in case of reducing a size of an image on a screen split interface of a mobile terminal according to one embodiment of the present invention.

FIG. 14 is a diagram showing one example of providing a replay in case of reducing a size of an image on a screen split interface of a mobile terminal according to one embodiment of the present invention. In the embodiment shown in FIG. 14, the description of the substance redundant with that of FIGS. 4 to 6 shall be omitted.

Referring to a first diagram of FIG. 14, the mobile terminal may output a cooking program image to the first region 10 of the screen split interface. In doing so, it is a manner of course that the outputted image can include the aforementioned various images as well as the cooking program image. And, the mobile terminal may output the cooking program image in a first size 1410 to the first region 10. In doing so, the mobile terminal may sense a first control input 1441 to the split indicator. Herein, the first control input 1441 is assumed as the same as the control input shown in FIGS. 4 to 11.

If the first control input 1410 is sensed, the mobile terminal may extract a primary play part previously played with reference to a current timing or view of the cooking program image. For instance, the primary play part in the cooling program may correspond to an image per step of preparing a meal. Moreover, for instance, if the currently played image is a drama or movie, a play part may be extracted per schedule time [not shown in FIG. 14].

In this case, as shown in a second drawing of FIG. 14, in response to the first control input 1441, the mobile terminal may adjust a size of the first region 10 into a second size 1420. Simultaneously with this, the mobile terminal may output a primary play preview 1450 to the first region in the second size 1420. For instance, in the embodiment of FIG. 14, 3 previews are outputted, by which the present invention is non-limited. Meanwhile, in case of the primary play part, according to the adjustment into the second size 1420, a region may be cropped centering on a target region and then outputted as a preview. The target region of the cooking program is assumed as the same as described in FIG. 6.

The mobile terminal may sense a second control input 1442 to one of the three previews. For instance, the second control input 1442 may correspond to a short touch input. In this case, as shown in a third drawing of FIG. 14, the mobile terminal may control an image 1430 corresponding to the second preview to be played in the first region in the second size 1420. Particularly, the mobile terminal may play the cooking program image again by starting with the second preview image previously played before a current timing or view.

Figure 15:
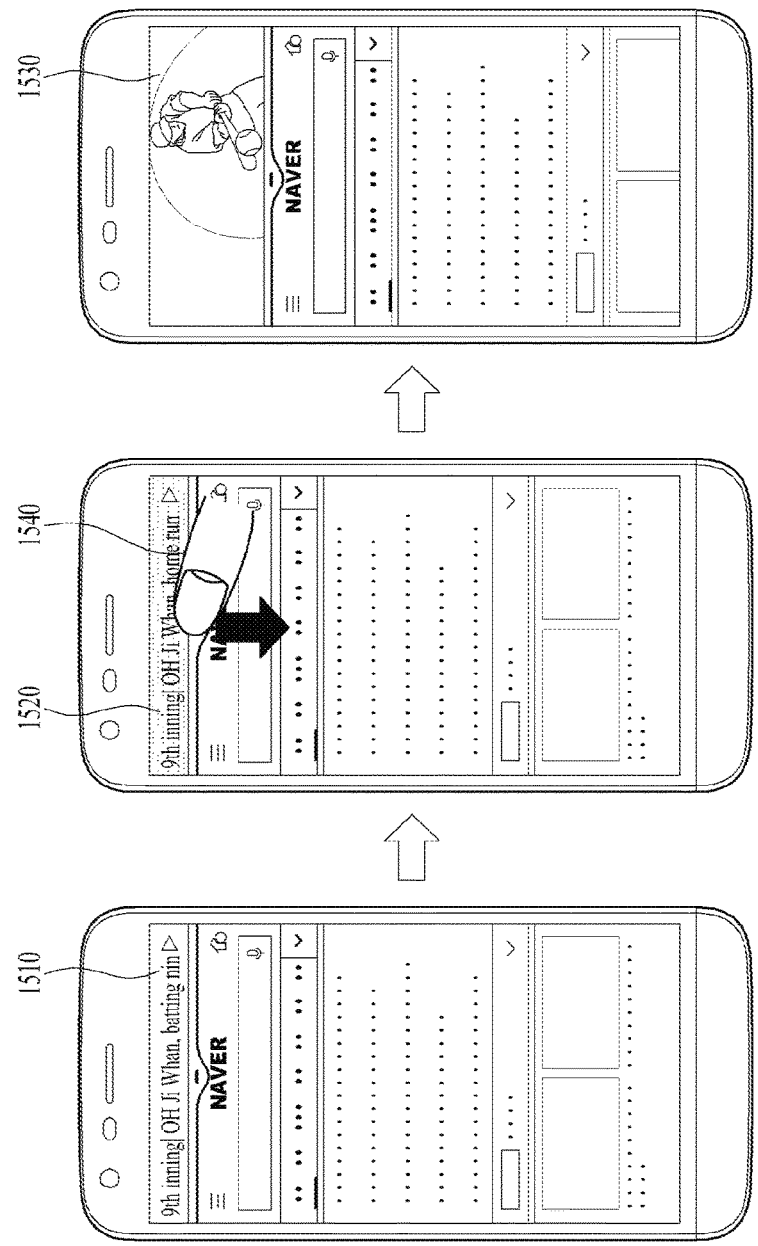
FIG. 15 is a diagram showing one example of providing an indicator while a first region of a screen split interface of a mobile terminal according to one embodiment of the present invention is outputted in a third size.

FIG. 15 is a diagram showing one example of providing an indicator while a first region of a screen split interface of a mobile terminal according to one embodiment of the present invention is outputted in a third size. In the embodiment shown in FIG. 15, the description of the substance redundant with that of FIG. 7 shall be omitted.

Referring to a first diagram of FIG. 15, the mobile terminal may output the first region 10 of the screen split interface in a third size 1530. In doing so, the mobile terminal may output audio simultaneously while outputting play information to the first region 10. In the embodiment of FIG. 15, a currently played image is assumed as a baseball game image. Namely, a user is listening to a baseball game broadcast while checking live baseball game broadcast information without watching the game image.

In doing so, there may occur an event such as a score change in the baseball game. If so, as shown in a second drawing of FIG. 15, the mobile terminal receives broadcast information and then outputs notification information 1520 to the first region. for instance, the notification indicator 1520 may correspond to a graphic effect, a text movement, a color highlight and/or the like. In this case, a user may intend to check a real game image owing to the provided notification indicator 1520. Moreover, the mobile terminal may sense a control input 1540 to the split indicator. Herein, the control input 1540 is a drag & drop touch input and may correspond to an input in a direction opposite to that of the control input shown in FIGS. 4 to 11.

Referring to a third diagram of FIG. 15, in response to the control input 1540, the mobile terminal may enlarge the size of the first region and then output the baseball game image to the enlarged region. In doing so, the size of the first region may be determined to correspond to a drop point of the drag & drop touch input. In the embodiment of FIG. 15, the first region size determined to correspond to the drop point is assumed as corresponding to a second size 1530. Hence, the mobile terminal may crop a region from the baseball game image in a default size centering on a target region and then output the cropped region to the first region only. A method of cropping the target region from the baseball game image is assumed as the same as described in FIG. 7.

Through the above embodiment, while intensively using a different application in a second region, a user may not miss an important part of a sports game currently played in the first region.

Figure 16:
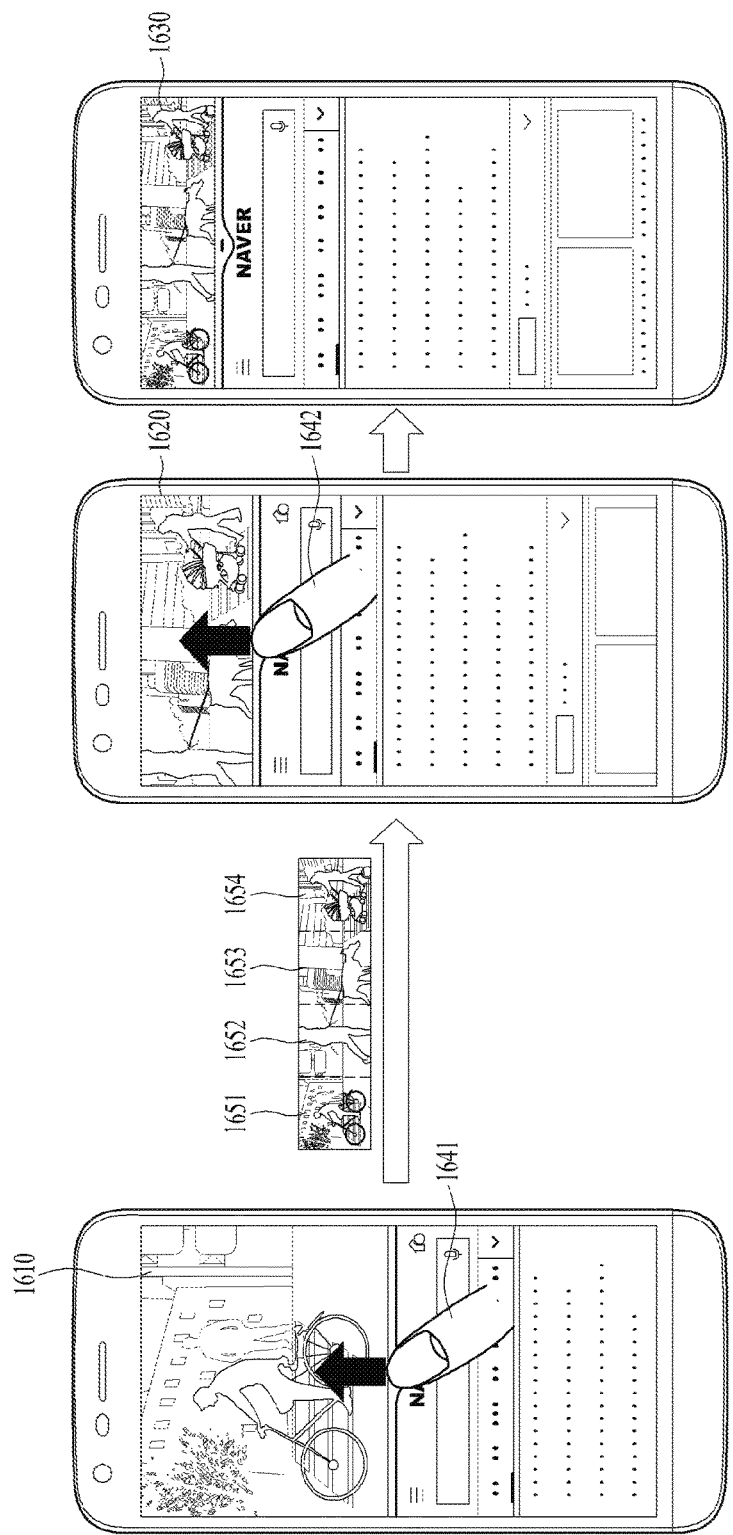
FIG. 16 is a diagram showing one example of outputting a multiview image to a first region of a screen split interface of a mobile terminal according to one embodiment of the present invention.

FIG. 16 is a diagram showing one example of outputting a multiview image to a first region of a screen split interface of a mobile terminal according to one embodiment of the present invention.

A video simultaneously recorded through a plurality of cameras can be provided to a user in various forms. For instance, a multiview image captured at 360° may be diagrammatized into a cylindrical shape, a rectangular shape and the like. If a multiview video is diagrammatized into a rectangular shape, it may be represented as distorted different from the real more or less. Yet, a user can advantageously recognize it at a time. A multiview of the present embodiment is assumed as represented in a rectangular shape. For clarity, a multiview image is assumed as divided into four angle images according to angles.

Referring to a first diagram of FIG. 16, the mobile terminal may output the first region 10 of the screen split interface in a first size 1610. In doing so, the outputted first region 10 may output a first angle image 1651 of a multiview video. Namely, if the multiview video is outputted in the first size 1610, one angle region in the multiview video may be outputted only. Herein, the outputted angle image may correspond to an angle image set by a user or an angle image set as a default. For instance, in FIG. 16, the outputted first angle image may correspond to an angle at which such an event as object's movement occurs.

The mobile terminal may sense a first control input 1641 to the split indicator. In the embodiment of FIG. 16, the first control input 1641 is assumed as the same control input described in FIGS. 4 to 11.

In this case, in response to the first control input 1641, the mobile terminal may extract an angle region, at which a different event other than the event in the first angle image occurs, from a multiview image. For instance, in the embodiment of FIG. 16, the event may correspond to a case that a movement of an object included in a video occurs. Moreover, for instance, if the multiview image is a baseball game image, such an event may include one of spectators' movement, movement occurrence in the broadcasting booth, and the like as well as baseball player's movement and ball's movement [not shown in FIG. 16]. In the embodiment of FIG. 16, assume that different movements are sensed from a second angle image 1652, a third angle image 1653 and a fourth angle image 1654.

Based on a drop point of the first control input 1641, the mobile terminal may change a size of the first region 10. For instance, the mobile terminal may change the size of the first region 10. For instance, referring to a second diagram of FIG. 16, the mobile terminal may change the size of the first region 10 into a second size 6120. And, the mobile terminal may change the first angle image 1651 in the first size into the third and fourth angle images 1653 and 1654 in the second size 1620 and then output them. Namely, in response to a control input for reducing the size of the first region 10, the mobile terminal may output a different angle image containing a movement in the multiview image.

While the first region 10 is outputted in the second size 1620, the mobile terminal may sense a second control input 1642. Herein, the second control input 1642 may correspond to a drag & drop touch input in the same direction of the first control input 1641.

In this case, based on a drop point of the second control input 1642, the mobile terminal may change the size of the first region 10. For instance, referring to a third diagram of FIG. 16, the mobile terminal may change the size of the first region 10 into a size 1630 smaller than the second size 1620. Herein, the size 1630 smaller than the second size may correspond to a size greater than the third size described in FIGS. 4 to 11. As the size of the first region 10 is changed, the mobile terminal may output the angle regions 1651 to 1654 shown in FIG. 16. Through this, while watching the multiview image, in response to the size adjustment of the first region 10, a user can easily check a different angle region in which an event such as a movement occurs simultaneously.

Figure 17:
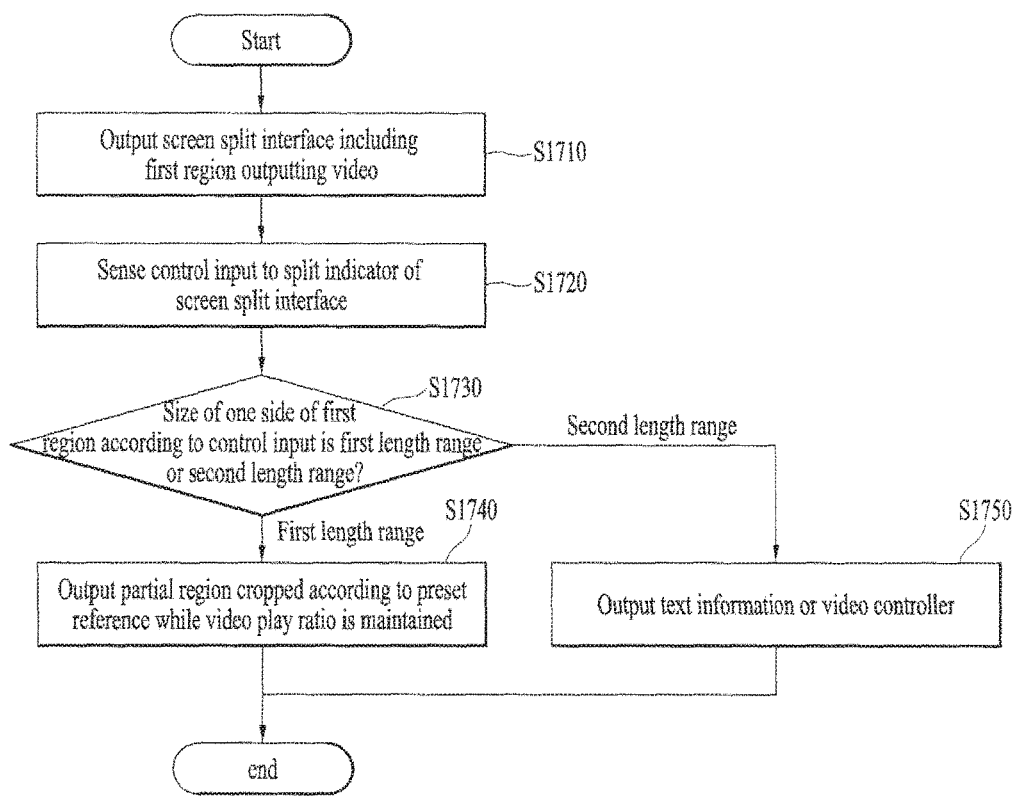
FIG. 17 is a flowchart showing a method of controlling a mobile terminal according to one embodiment of the present invention.

FIG. 17 is a flowchart showing a method of controlling a mobile terminal according to one embodiment of the present invention.

First of all, a mobile terminal may output a video to a first region of a screen split interface [S1710]. As described in FIG. 14, it is apparent that the video can be outputted to a second region. And, the video, which is outputted when the screen split interface is outputted, may be outputted in a first size that is a default size.

The mobile terminal may sense a control input to a split indicator of the screen split interface [S1720]. As described in FIG. 4, the split indicator may correspond to an indicator for dividing a display into a first region and a second region and adjusting sizes of the first region and the second region. And, as described in FIGS. 4 to 11, the control input may correspond to a drag & drop touch input for reducing at least one of a width and height of the first region.

The mobile terminal may determine whether a height size of the first region according to the control input corresponds to a first length range or a second length range [S1730]. Namely, according to the height size of the first region corresponding to a drop point of the drag & drop touch input, the mobile terminal may determine a content to output to the first region.

In the step S1730, if the height size corresponds to the first length range, the mobile terminal may output a partial region cropped according to a preset reference to the first region while a video play ratio is maintained [S1740]. Herein, the partial region cropped according to the preset reference may correspond to a target region. As described above, the preset reference may correspond to a region from which a face, a caption, a movement or the like is recognized in an image. In this case, the mobile terminal may crop the target region and then output the cropped region to the first region, while maintaining the play ratio of the image outputted in the default size.

Meanwhile, in the step S1730, if the height size corresponds to the second length range, the mobile terminal may output a text or controller to the first region [S1750]. This is because a size of the first region is small before outputting an image. Yet, if the size is changed into a third size, the mobile terminal may output audio without an image output.

Accordingly, embodiments of the present invention provide various effects and/or features.

According to at least one of embodiments of the present invention, although a size of a video play region is changed in the course of watching a video by multitasking, the video can be advantageously played in a state that a video play ratio is maintained.

According to at least one of embodiments of the present invention, although a size of a video play region is changed in the course of watching a video by multitasking, an important region of the video can be continuously provided to a user.

According to at least one of embodiments of the present invention, as a size of a video play region is reduced in the course of watching a video by multitasking, although an image cannot be provided, video information can be continuously provided through a text.

Furthermore, for clarity, the description is made with reference to each of the divided drawings. Yet, by combining the embodiments described in the respective drawings, it is possible to design a new embodiment to be implemented.

This description of a mobile terminal and controlling method thereof is intended to be illustrative, and not to limit the scope of the claims. The exemplary embodiments described herein may be selectively combined entirely or in part to enable various modifications.

Various embodiments may be implemented using a machine-readable medium having instructions stored thereon for execution by a processor to perform various methods presented herein. Examples of possible machine-readable mediums include HDD (Hard Disk Drive), SSD (Solid State Disk), SDD (Silicon Disk Drive), ROM, RAM, CD-ROM, a magnetic tape, a floppy disk, an optical data storage device, the other types of storage mediums presented herein, and combinations thereof. If desired, the machine-readable medium may be realized in the form of a carrier wave (for example, a transmission over the Internet). The processor may include the controller 180 of the mobile terminal. The foregoing embodiments are merely exemplary and are not to be considered as limiting the present disclosure. The present teachings can be readily applied to other types of methods and apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments. As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds, are therefore intended to be embraced by the appended claims.

What is claimed is:

1. A mobile terminal, comprising:
    a display outputting a screen split interface including a first region, a second region and a split indicator located between the first region and the second region;
    a sensing unit;
    a wireless communication unit; and
    a controller configured to:
        recognize a control input received at the split indicator and sensed by the sensing unit while a video is being displayed in a first size in the first region;
        extract a feature part of the video and cause the display to display the feature part in the first region, a size of the first region changed from the first size to a second size such that the feature part is displayed in the second size, in response to the control input when the control input causes a size of one side of the first region to be within a first length range; and
        cause the display to display text information or a control icon associated with the video in the first region by changing the size of the first region to a third size in response to the control input when the control input causes the size of the one side of the first region to be within a second length range,
    wherein the first size is greater than the second and third sizes, and the second size is greater than the third size,
    wherein the controller is further configured to:
        receive a message through the wireless communication unit;
        cause the display to display a reply region for replying to the received message and a keypad region;
        increase a size of the reply region and resize the size of the first region, such that resized first region is smaller than the second size and greater than the third size, as an amount of text input via the keypad region increases; and
        cause the display to display the feature part of the video in the resized first region when the size of the reply region is increased.

2. The mobile terminal of claim 1, wherein the feature part of the video displayed in the second size is a portion of the video resulting from cropping the feature part by maintaining a play ratio of the video in the first size and then outputting the cropped feature part.

3. The mobile terminal of claim 1, wherein the feature part is different according to a type of the video.

4. The mobile terminal of claim 1, wherein when a plurality of feature parts are extracted, the controller is further configured to:
    combine the plurality of the feature parts and cause the display to display the combined feature parts in the first region; or
    enlarge a prescribed one of the plurality of feature parts according to a preset reference and cause the display to display the enlarged one of the plurality of feature parts.

5. The mobile terminal of claim 1, wherein when one side of the extracted feature part is smaller than one side of the second sized first region, the controller is further configured to crop the feature part and an ambient region together.

6. The mobile terminal of claim 1, wherein when the extracted feature part is shifted while the video is displayed, the controller is further configured to crop the feature part from the video in the first size based on a location of the shifted feature part.

7. The mobile terminal of claim 1, further comprising a speaker, wherein when the size of the first region is changed from the first size to the second size or the third size, the controller is further configured to continue causing the speaker to output audio of the video being displayed.

8. The mobile terminal of claim 1, wherein:
the video comprises a real-time broadcasted video and a stored video; and
when the video is a real-time broadcast program including an advertisement image, the controller is further configured to change the size of the first region to the third size during an output of a portion of the video corresponding to the advertisement image.

9. The mobile terminal of claim 1, wherein:
when the size of the one side of the first region is changed according to the control input, the controller is further configured to maintain a size of another side of the first region; and
the one side of the first region corresponds to a height of the first region and the other side of the first region corresponds to a width of the first region.

10. The mobile terminal of claim 1, wherein when an event related to the video occurs while the text information is displayed in the third sized first region, the controller is further configured to cause the display to display a notification indicator.

11. The mobile terminal of claim 1, wherein when the size of the one side of the first region is within the first length range, the controller is further configured to change the size of the first region to the second size and cause the display to display at least one play preview in the second sized first region.

12. The mobile terminal of claim 1, wherein the control input comprises dragging the split indicator such that at least one of the size of the first region or a size of the second region is changed according to a distance of the dragging, the size of the first region decreasing when the size of the second region increases or the size of the first region increasing when the size of the second region decreases.

13. The mobile terminal of claim 1, wherein the controller is further configured to cause the display to display an execution screen corresponding to an application that is different from an application for the video in the second region while the video is displayed in the first region.

14. The mobile terminal of claim 13, wherein:
the keypad region, instead of the execution screen, is displayed in the second region in response to a user input received via the reply region;
the user input is received while the video, the execution screen corresponding to the different application, the message, and the reply region are displayed all together on the display, the video displayed in the first region, the execution screen displayed in the second region, and the message and the reply region displayed in the first region overlaying the video; and
the feature part of the video is displayed in the resized first region in response to the user input such that the feature part is not overlaid with the message and the reply region.

15. A method of controlling a mobile terminal, the method comprising:
displaying a video in a first size in a first region of a screen split interface outputted to a display, the screen split interface including a first region, a second region and a split indicator located between the first region and the second region;
sensing a control input received at the split indicator;
extracting a feature part of the video and displaying the feature part in the first region, a size of the first region changed from the first size to a second size such that the feature part is displayed in the second size, in response to the control input when the control input causes a size of one side of the first region to be within a first length range; and
displaying text information or a control icon associated with the video in the first region by changing the size of the first region to a third size in response to the control input when the control input causes the size of the one side of the first region to be within a second length range,
wherein the first size is greater than the second and third sizes, and the second size is greater than the third size,
wherein the method further comprises:
receiving a message through the wireless communication unit;
displaying a reply region for replying to the received message and a keypad region on the display;
increasing a size of the reply region and resizing the size of the first region, such that resized first region is smaller than the second size and greater than the third size, as an amount of text input via the keypad region increases; and
displaying the feature part of the video in the resized first region when the size of the reply region is increased.

16. The method of claim 15, wherein the feature part of the video displayed in the second size is a portion of the video resulting from cropping the feature part by maintaining a play ratio of the video in the first size and then outputting the cropped feature part.

17. The method of claim 15, wherein the feature part is different according to a type of the video.

18. The method of claim 15, further comprising:
combining a plurality of feature parts and displaying the combined feature parts in the first region when the plurality of feature parts are extracted from the video; or
enlarging a prescribed one of the plurality of feature parts according to a preset reference and displaying the enlarged one of the plurality of feature parts when the plurality of target regions are extracted from the video.

19. The method of claim 15, further comprising cropping the feature part and an ambient region together when one side of the extracted feature part is smaller than one side of the second sized first region.

20. The method of claim 15, wherein when the extracted feature part is shifted while the video is displayed, the method further comprises cropping the feature part from the video in the first size based on a location of the shifted feature part.

* * * * *